April 25, 1967  A. B. FLY ETAL  3,315,756

HYDRAULICALLY DRIVEN VEHICLE

Filed Aug. 23, 1965  17 Sheets-Sheet 1

*INVENTORS*
A. B. FLY & W. D. MCDEARMAN
BY
Ely Silverman
ATTORNEY

April 25, 1967  A. B. FLY ETAL  3,315,756
HYDRAULICALLY DRIVEN VEHICLE
Filed Aug. 23, 1965  17 Sheets-Sheet 2

INVENTORS
A. B. FLY & W. D. MCDEARMAN
BY Ely Silverman
ATTORNEY

April 25, 1967     A. B. FLY ETAL     3,315,756

HYDRAULICALLY DRIVEN VEHICLE

Filed Aug. 23, 1965     17 Sheets-Sheet 3

INVENTORS
A. B. FLY &
W. D. MCDEARMAN

BY *Ely Silverman*
ATTORNEY

INVENTORS
A. B. FLY & W. D. MCDEARMAN
BY
Ely Silverman
ATTORNEY

INVENTORS.
A. B. FLY & W. D. MCDEARMAN
BY
Ely Silverman
ATTORNEY

April 25, 1967 A. B. FLY ETAL 3,315,756
HYDRAULICALLY DRIVEN VEHICLE
Filed Aug. 23, 1965 17 Sheets-Sheet 7
FIG. 13
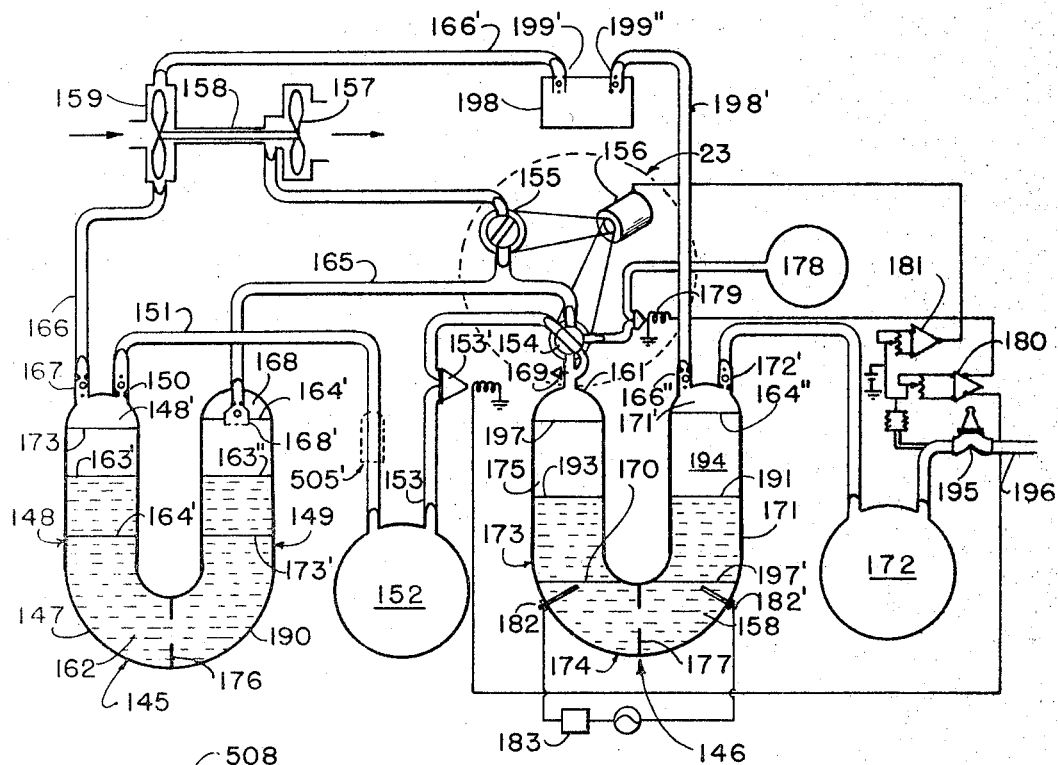
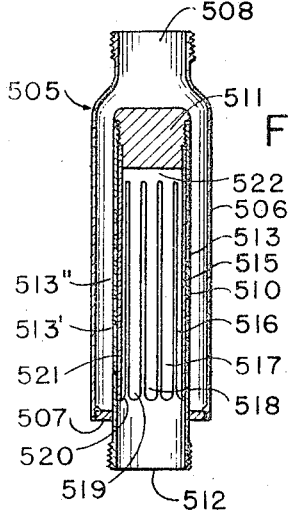
FIG. 30
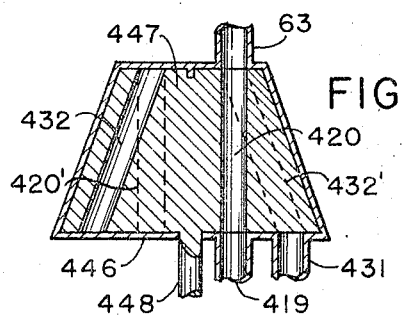
FIG. 29
INVENTORS
A.B. FLY & W. D. MCDEARMAN
BY
Ely Silverman
ATTORNEY

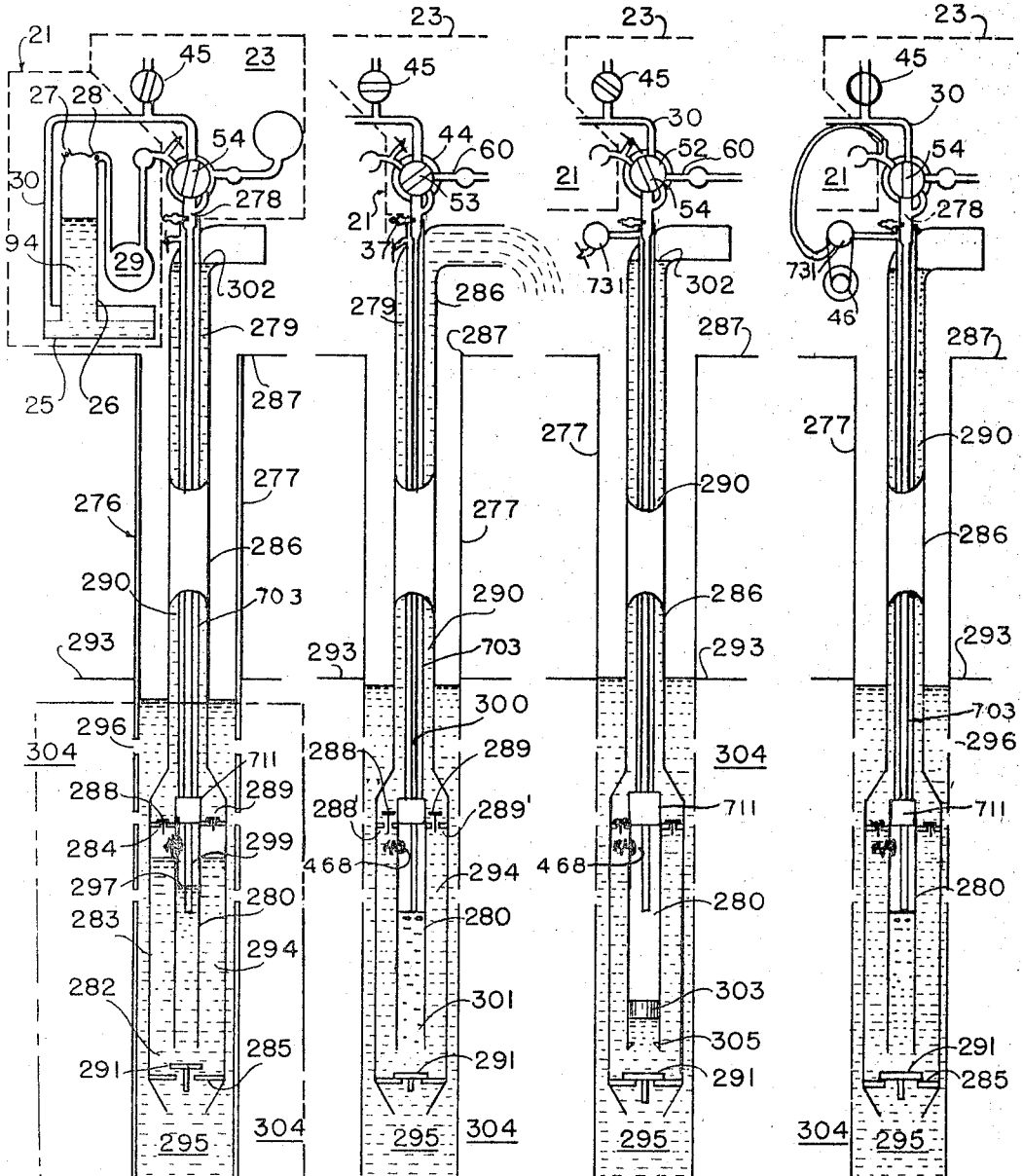

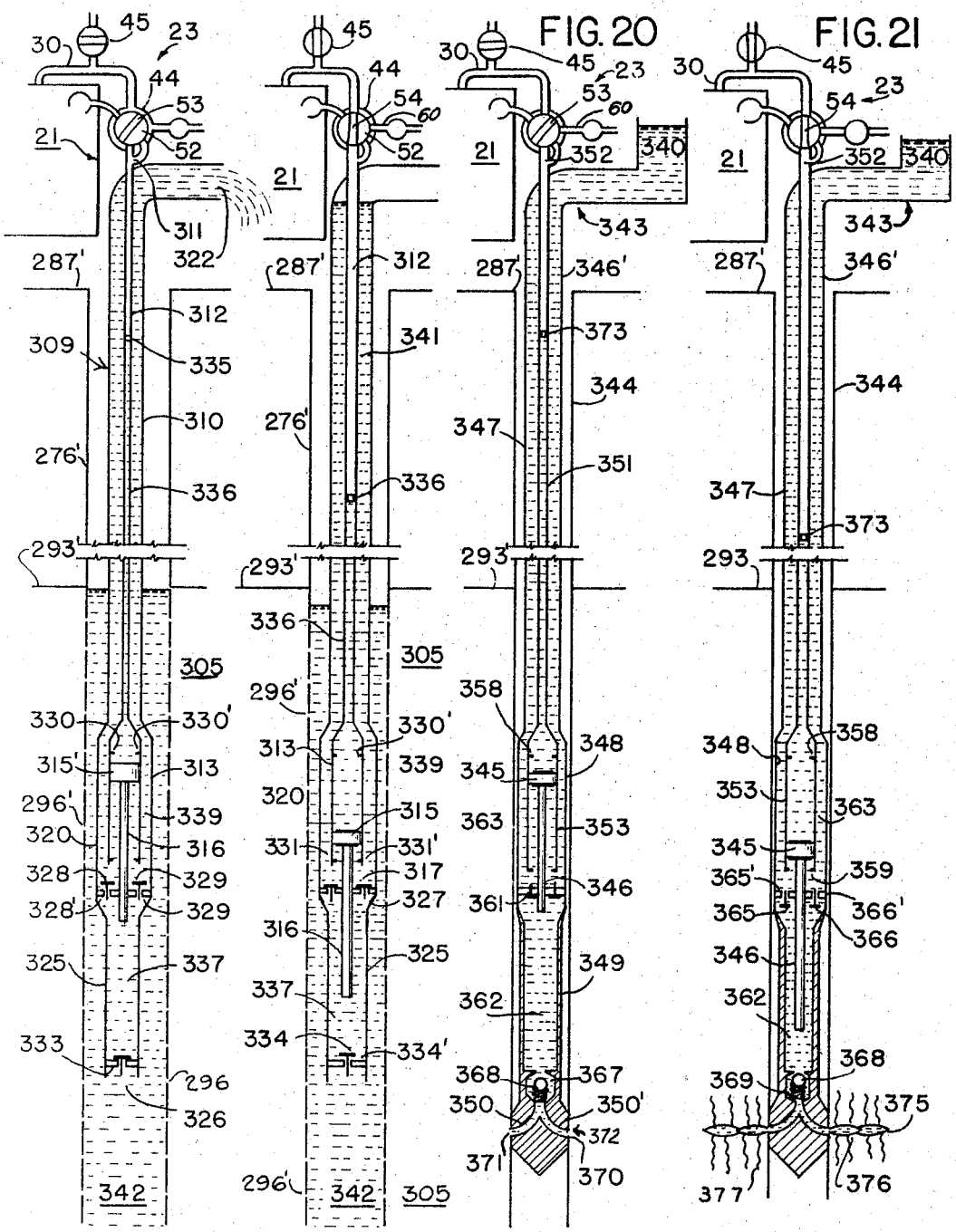

April 25, 1967 A. B. FLY ETAL 3,315,756
HYDRAULICALLY DRIVEN VEHICLE
Filed Aug. 23, 1965 17 Sheets-Sheet 10

INVENTORS.
A. B. FLY & W. D. MCDEARMAN
BY Ely Silverman
ATTORNEY

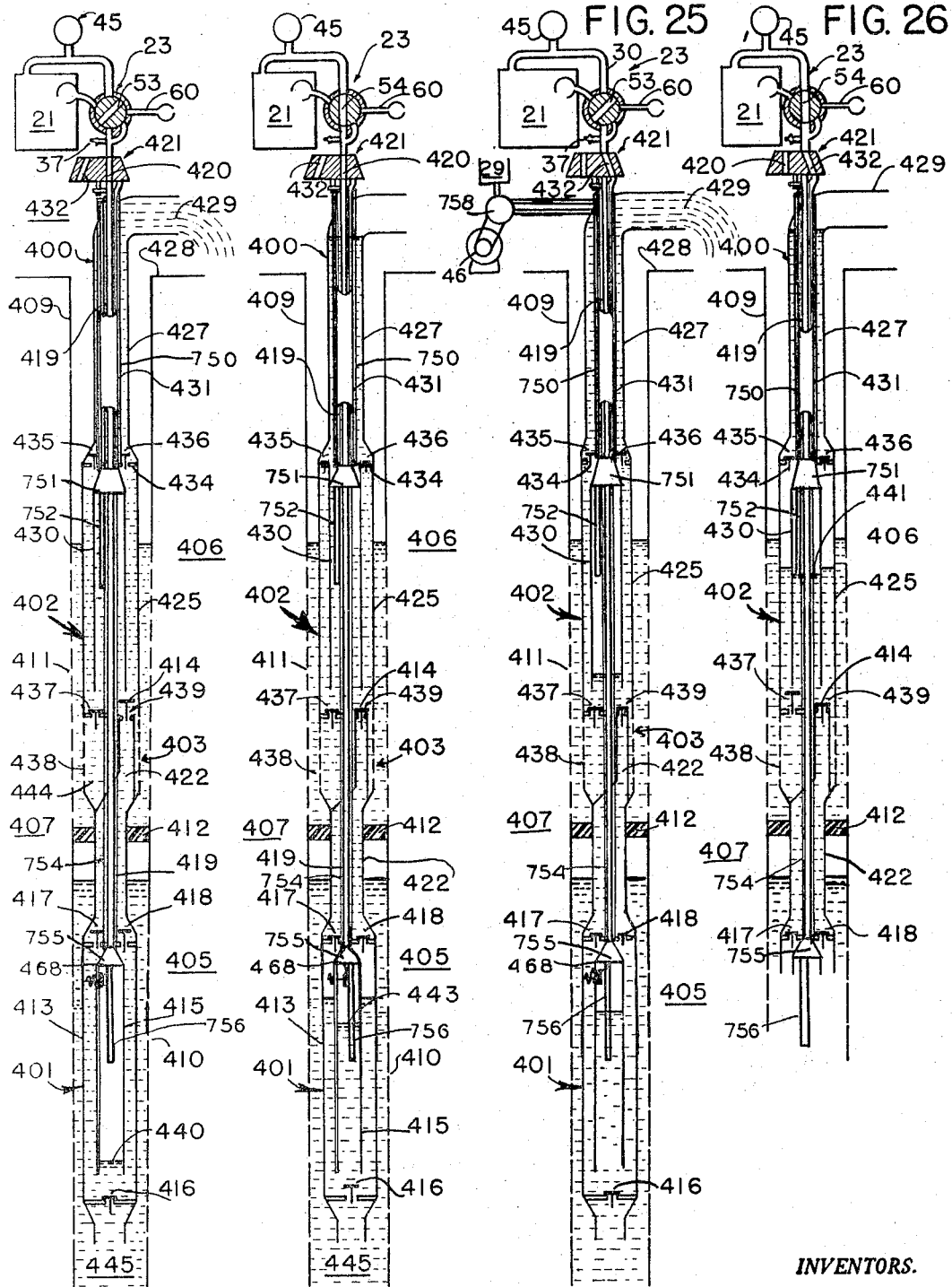

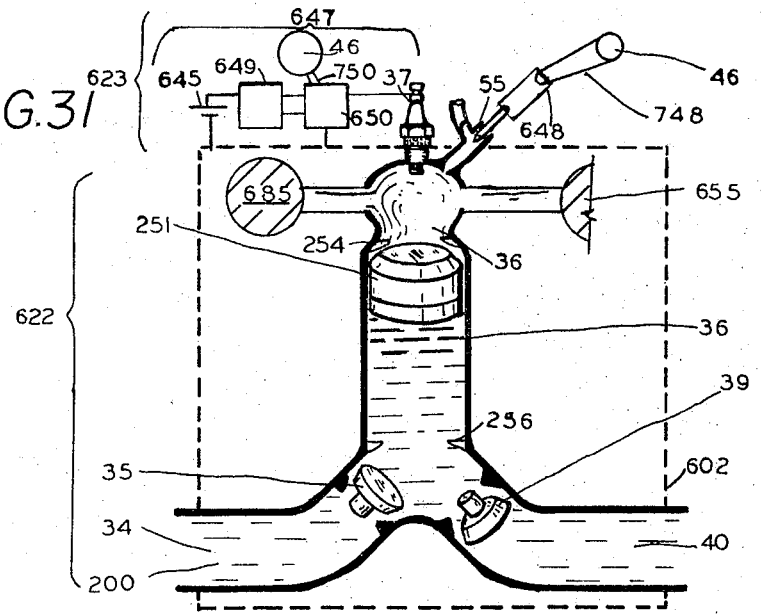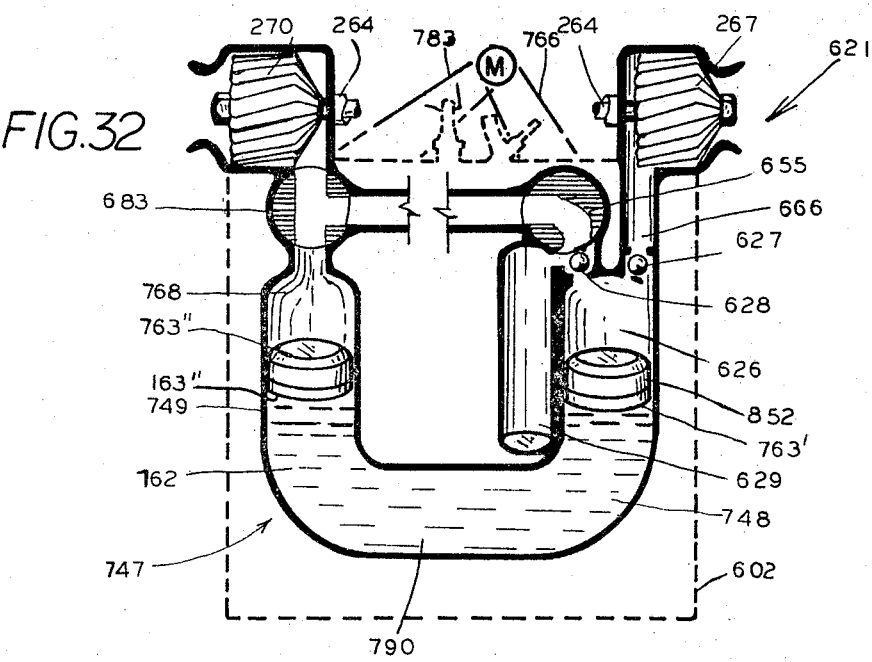

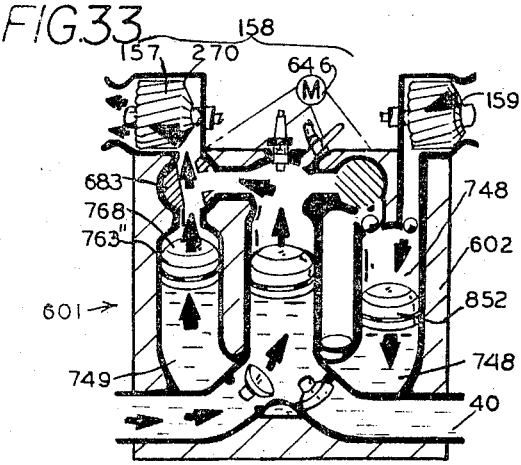
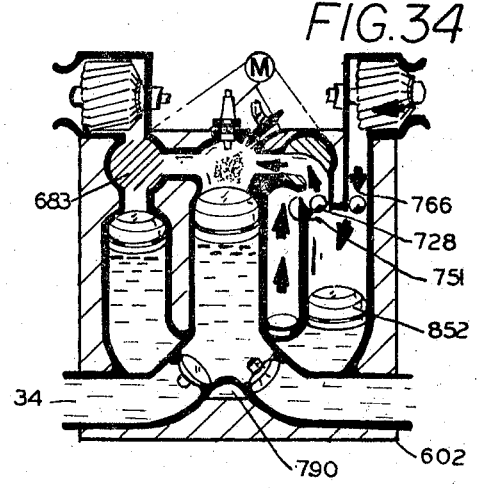
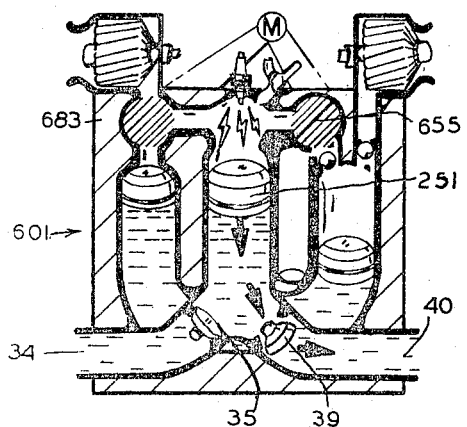
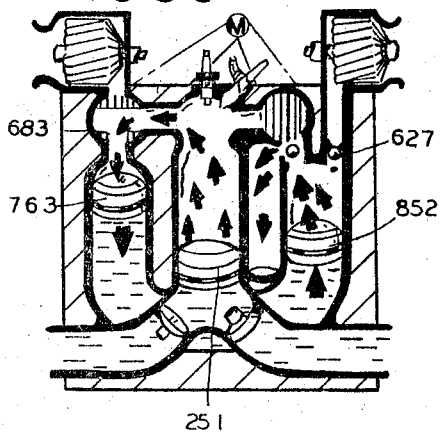
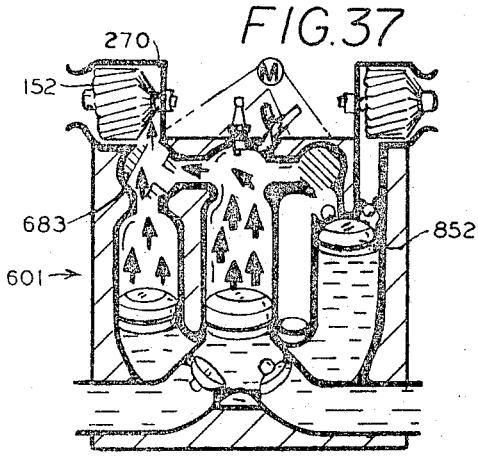

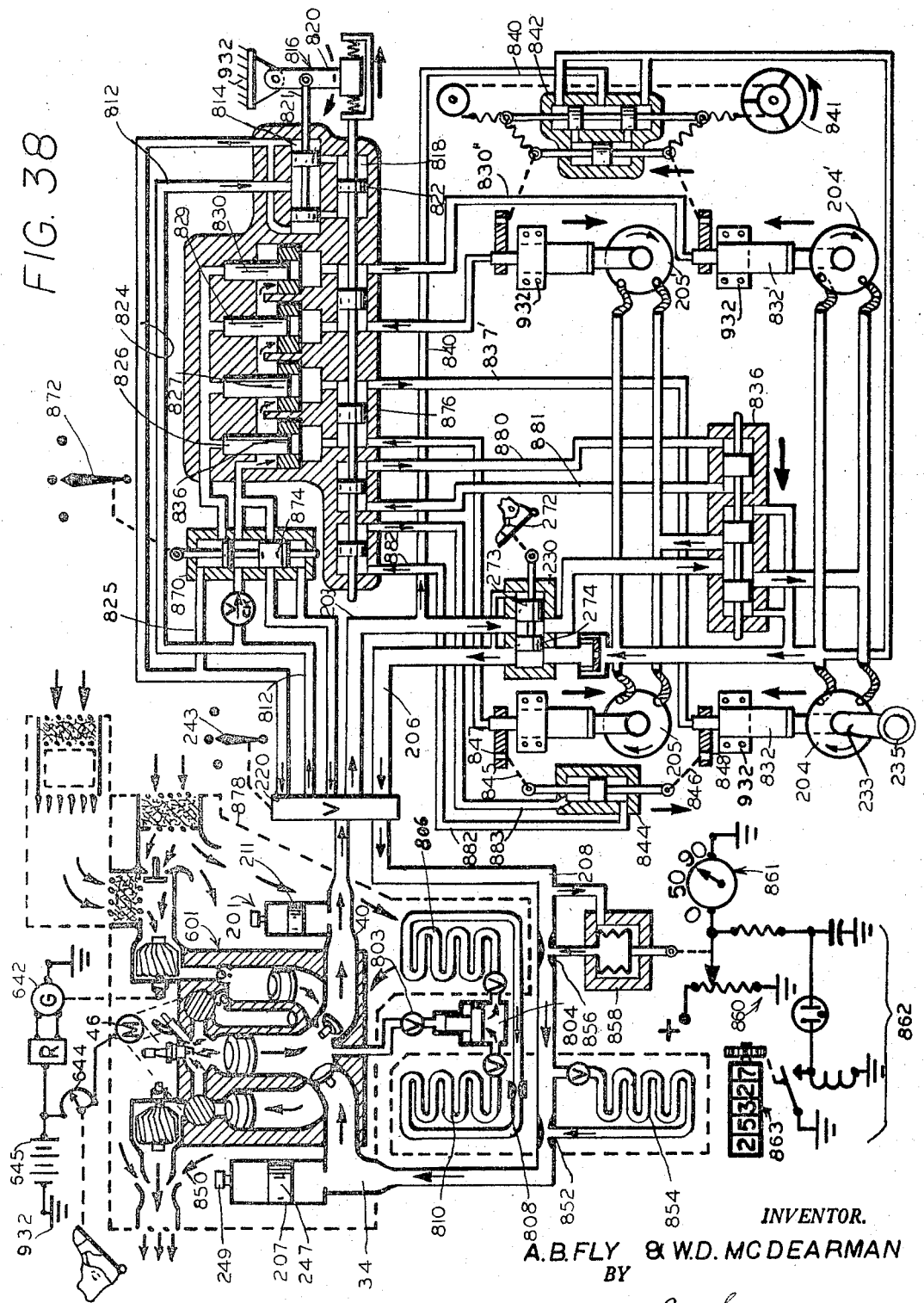

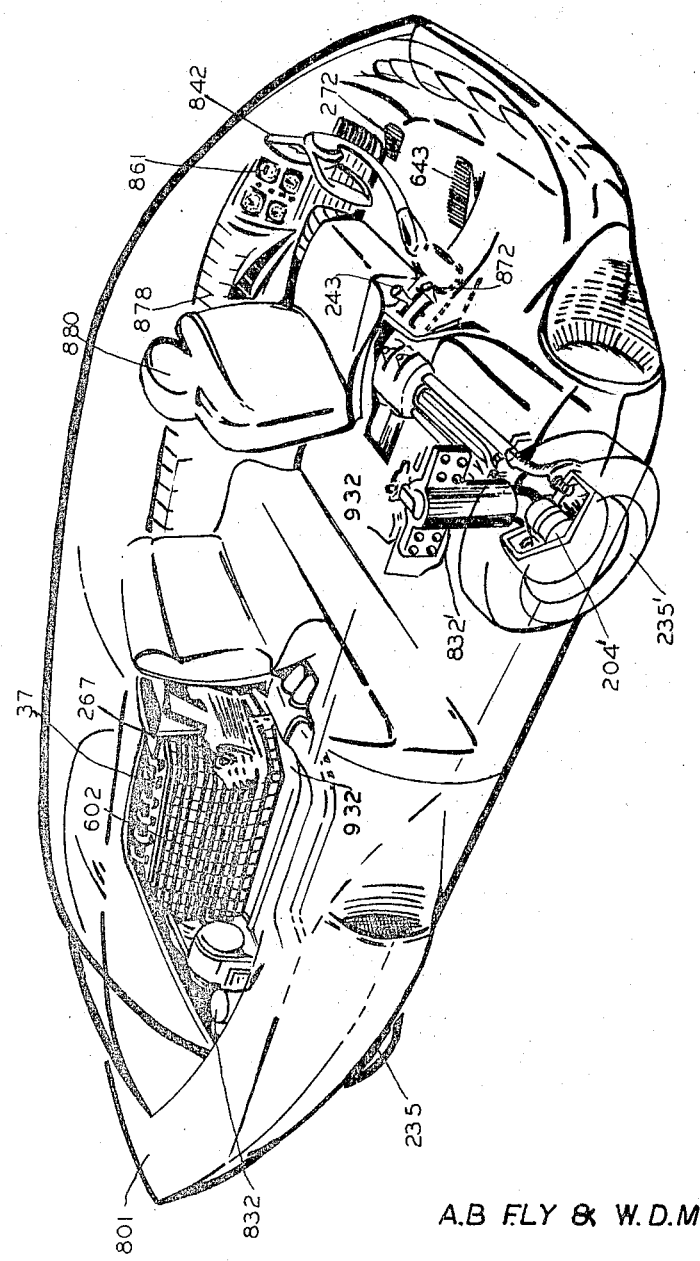

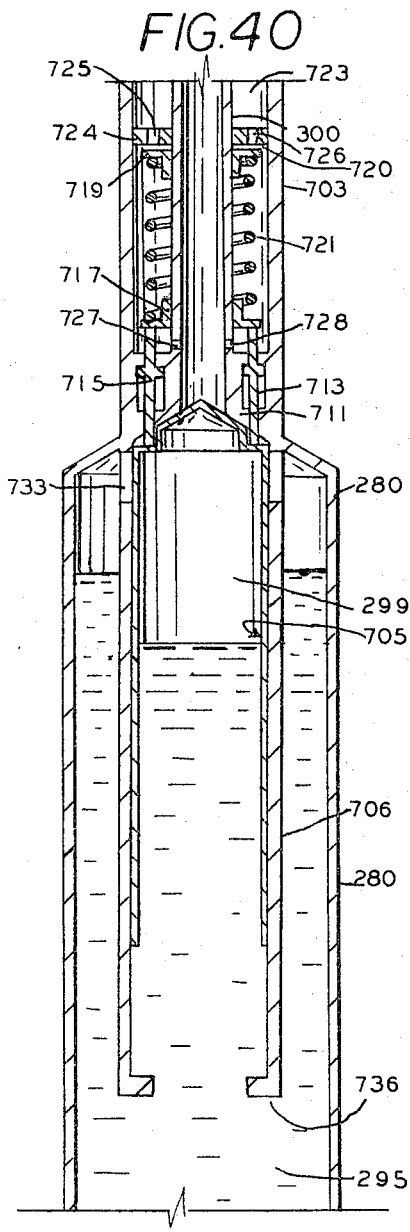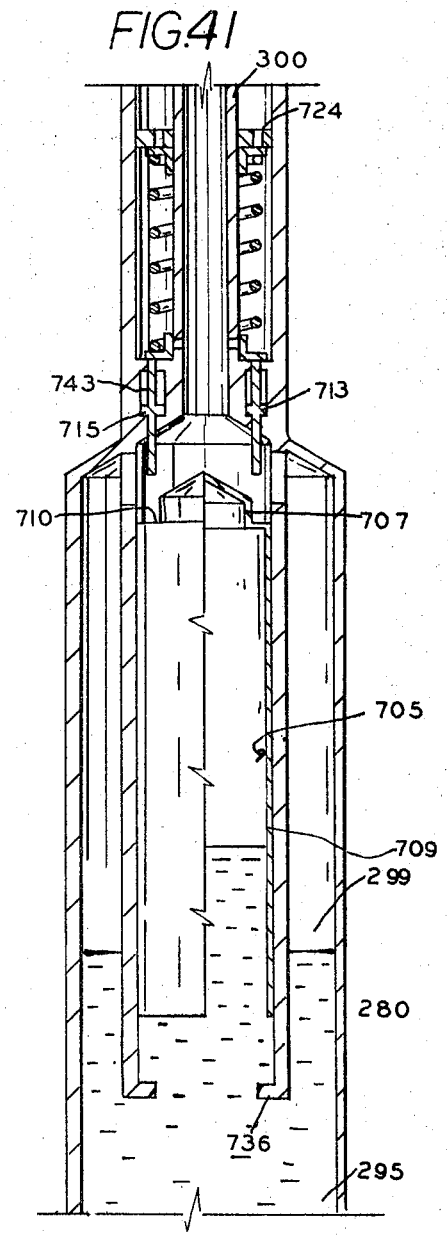

April 25, 1967  A. B. FLY ET AL  3,315,756
HYDRAULICALLY DRIVEN VEHICLE
Filed Aug. 23, 1965  17 Sheets-Sheet 17

A.B. FLY & W.D. MCDEARMAN
INVENTORS

BY

*Ely Silverman*

ATTORNEY

United States Patent Office 3,315,756
Patented Apr. 25, 1967

3,315,756
HYDRAULICALLY DRIVEN VEHICLE
Anderson Billy Fly and William David McDearman, Amarillo, Tex., assignors to Hydro-Torq Pump Company, Inc., Amarillo, Tex., a corporation of Texas
Filed Aug. 23, 1965, Ser. No. 481,879
4 Claims. (Cl. 180—44)

This application is a continuation-in-part of our copending application Ser. No. 93,110, filed on Mar. 3, 1961, now U.S. Patent 3,202,108.

Broadly this invention relates to new and useful methods and apparatuses for pumping fluids and combinations utilizing those methods and apparatuses.

One object of this invention is to provide an improved motor and pump method for pumping of fluids.

Another object of this invention is to provide an improved high pressure hydraulic engine simple in construction with few moving parts and a great flexibility of operation.

Yet another object of this invention is to provide a self-propelled automotive vehicle using the hydraulic engine of this invention.

Yet another object of this invention is to provide an improved automotive vehicle chassis and frame for use with a hydraulic engine such as that of this invention.

Still another object of this invention is to provide further improved methods of and apparatuses for well pumping.

Yet a further object of this invention is to provide an improved underground well pump unit for underground well pumping.

Yet still another object of this invention is to provide a ram jet compressor.

Yet another object of this invention is to provide an improved ram jet apparatus for use in combination with apparatuses of this invention.

Other objects and advantages of the methods and apparatuses of this invention will be apparent to those skilled in the art.

Generally, according to this invention there are provided method and apparatuses for pumping liquids at high pressure and power outputs with minimum of total moving parts and a minimum of components—only two valves per cylinder in one embodiment—exposed to abrasive fluid action. Pumping units according to this invention may be built in units capable of very great pressure and power outputs with thermal efficiencies equal or greater than diesel units of the same power output. Further, the operation of the method and apparatuses of this invention are flexible to meet the demands thereon during variations of load as well as in starting. The method and apparatuses herein are particularly well adapted to handling abrasive liquids as met in underground fluids. Variations of the method and apparatuses included within the scope of this invention are particularly adaptable to where high pressure and power outputs are needed and limited space is available, as in downwell pumps.

This invention comprises novel functions and cooperations thereof as well as novel combinations and structures of parts as will more fully appear on the course of the description, of which description the drawings attached hereto form a part.

In the drawings wherein like reference characters designate like parts in the several figures, FIGURE 1 is a diagrammatic representation of conditions in an assembly made according to this invention during the initial part of the period during which intake and upward movement of liquid occur in the combustion chamber and air intake occurs in the air compression chamber;

Figure 1:
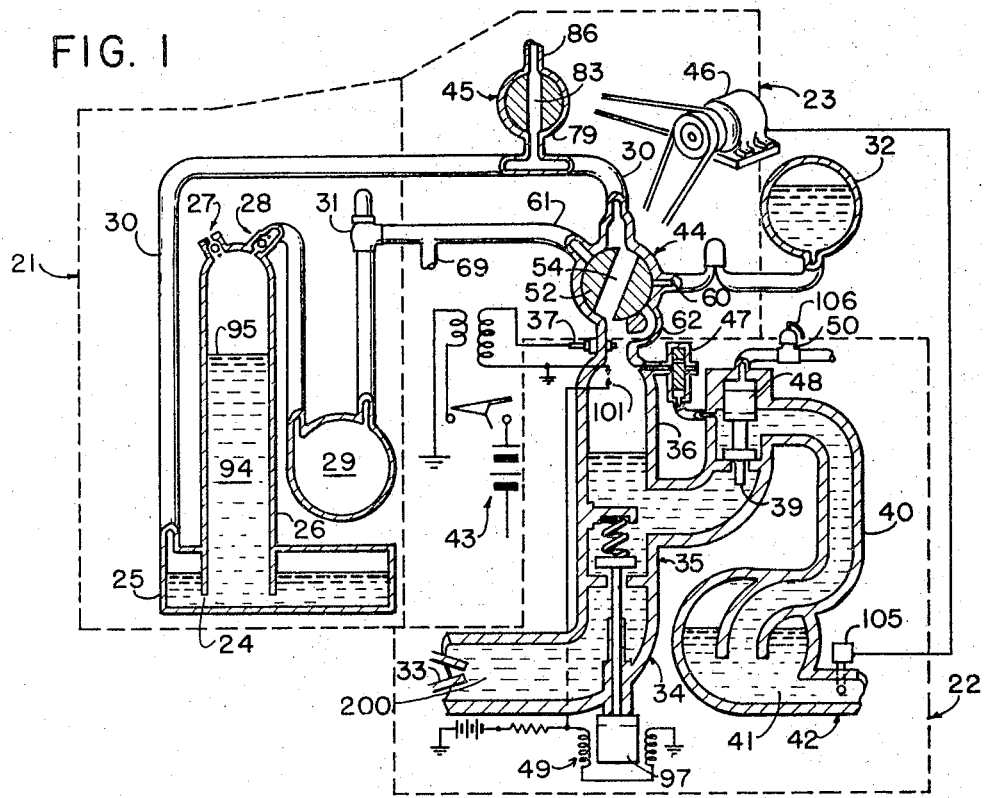
Figure 3:
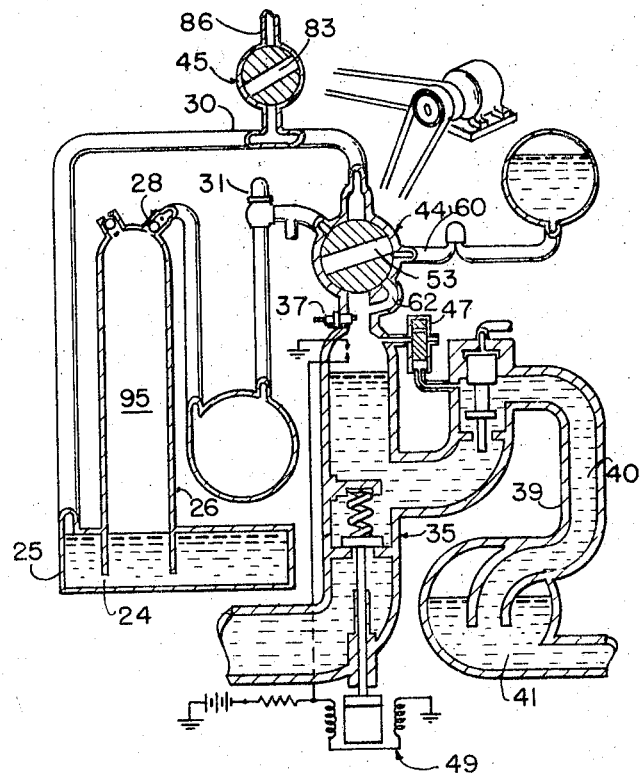
FIGURE 3 is a diagrammatic showing of the conditions in the assembly of FIGURE 1 during the initial part of the power stroke and downward motion of the liquid in the combustion chamber.
Figure 4:
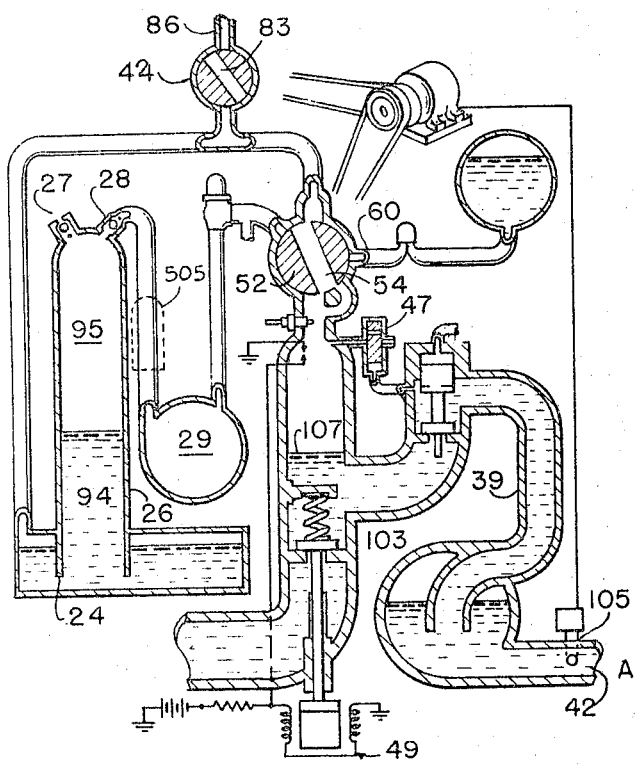
FIGURE 4 is a diagrammatic showing of conditions in the assembly of FIGURE 1 during the initial portion of the period of charging of the air compression cylinder by exhaust gases discharged from the combustion chamber.
Figure 5:
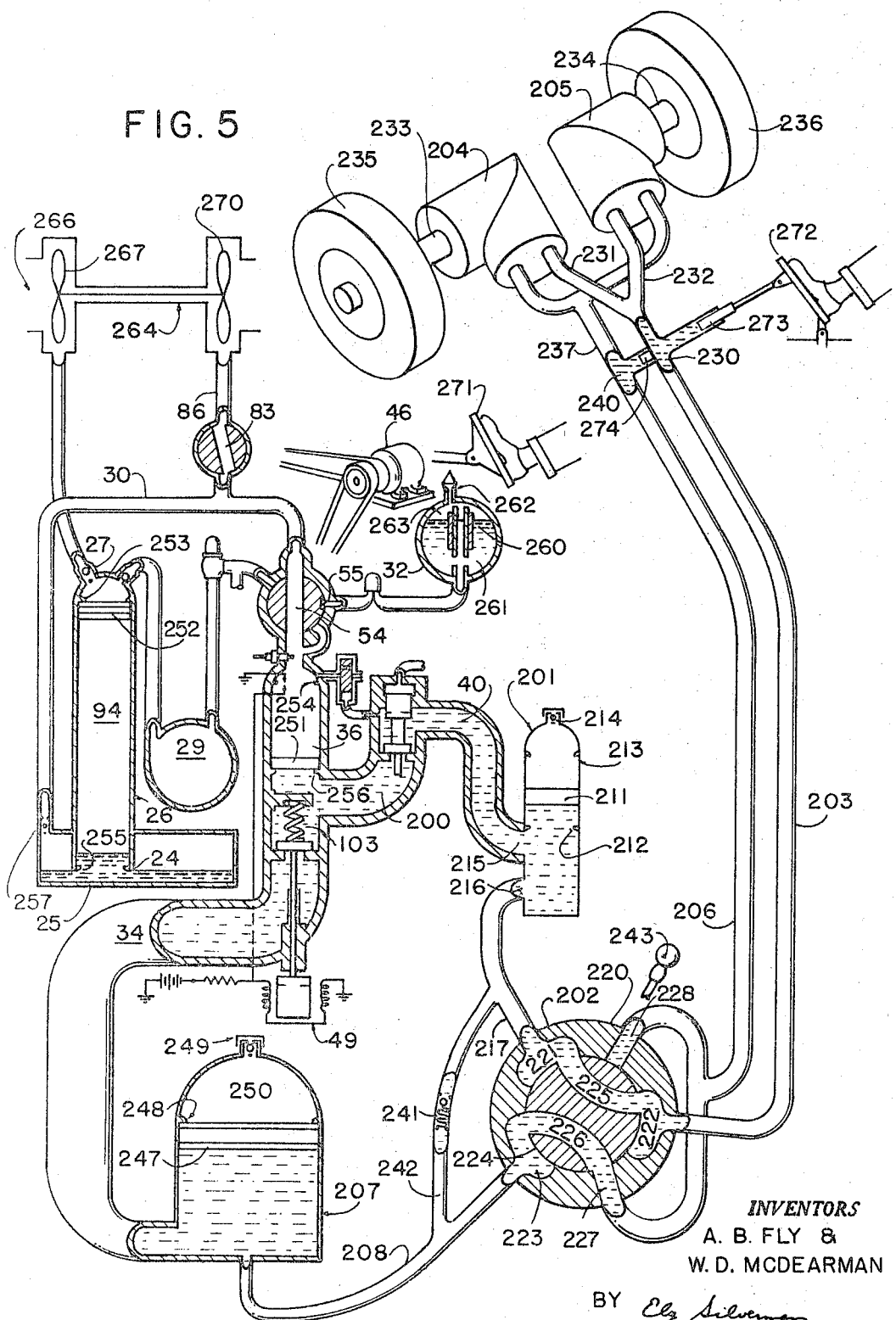
Figure 6:
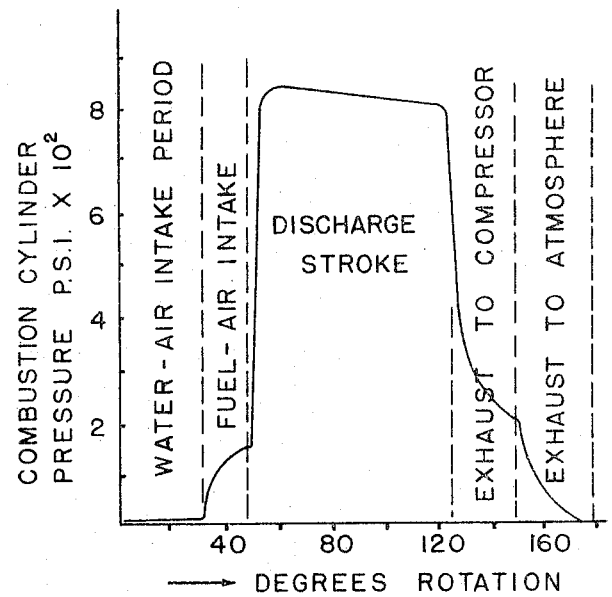
Figure 7:
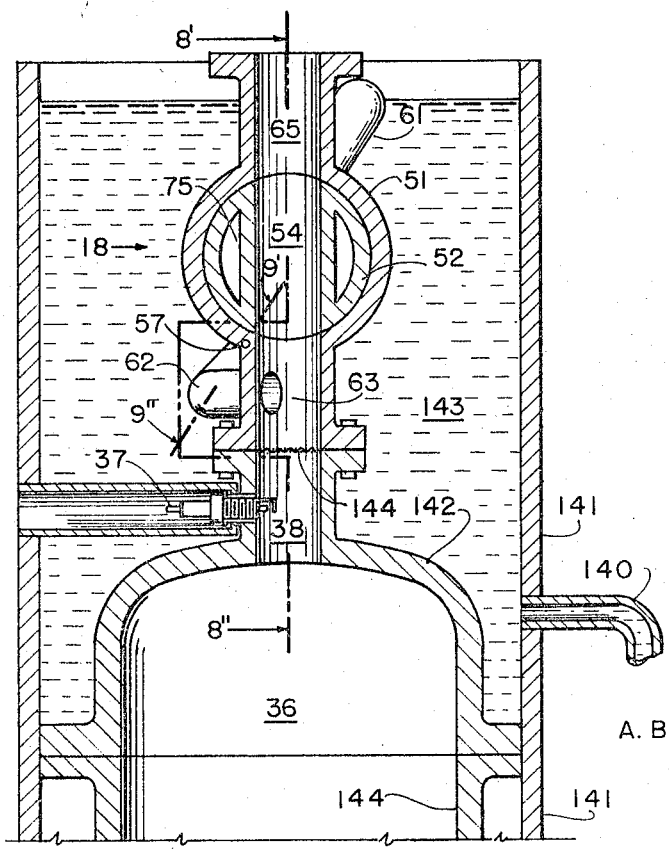
Figure 8:
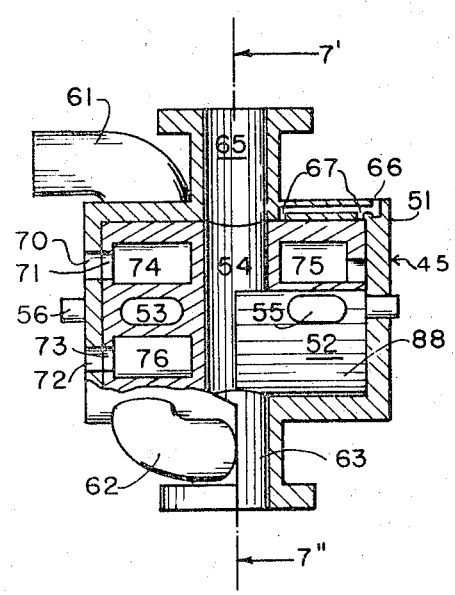
Figure 10:
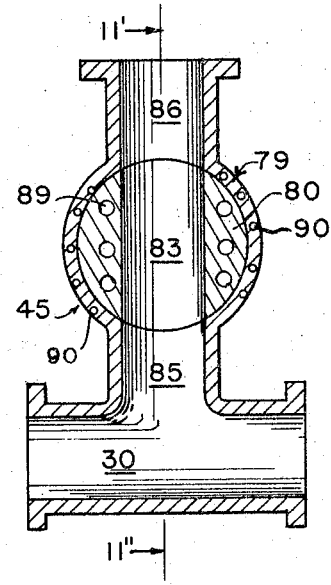
Figure 9:
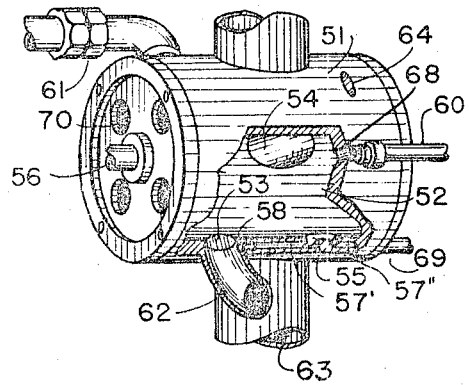
Figure 11:
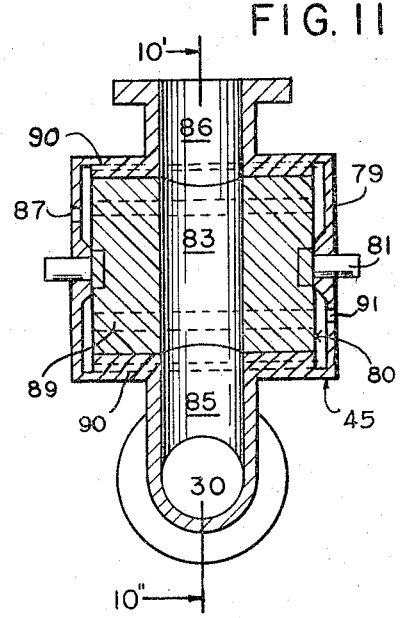
Figure 12:
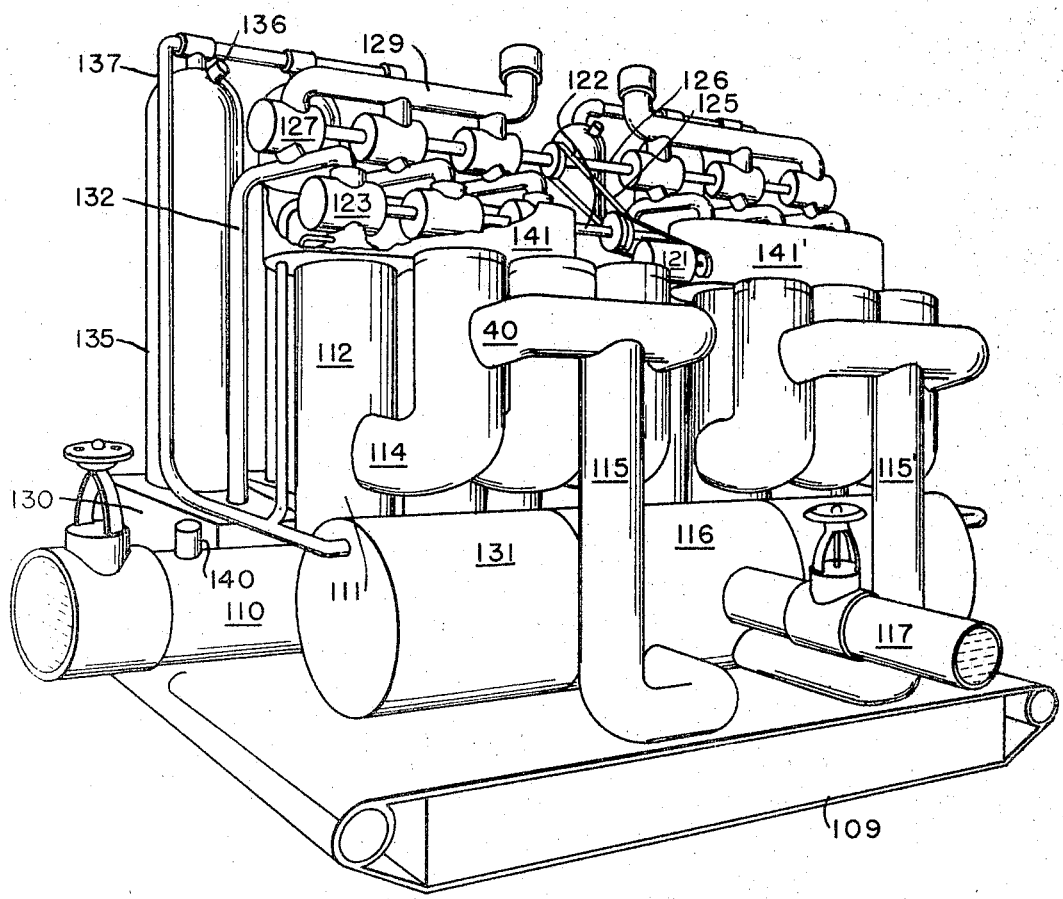
Figure 22:
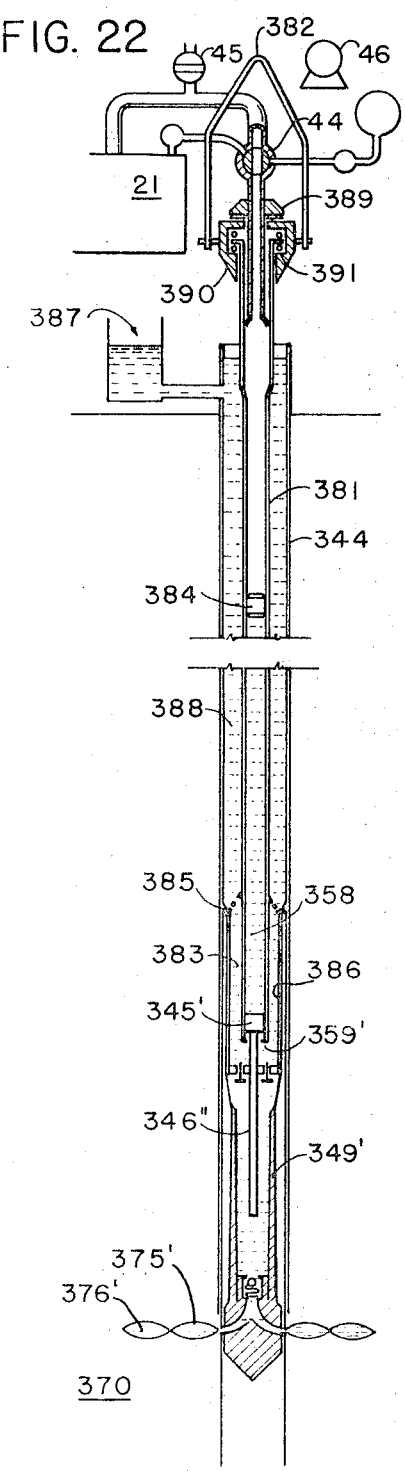
Figure 27:
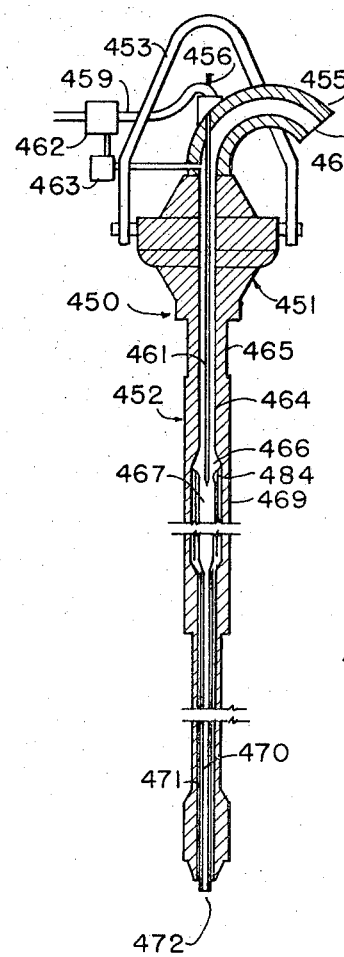
Figure 28:
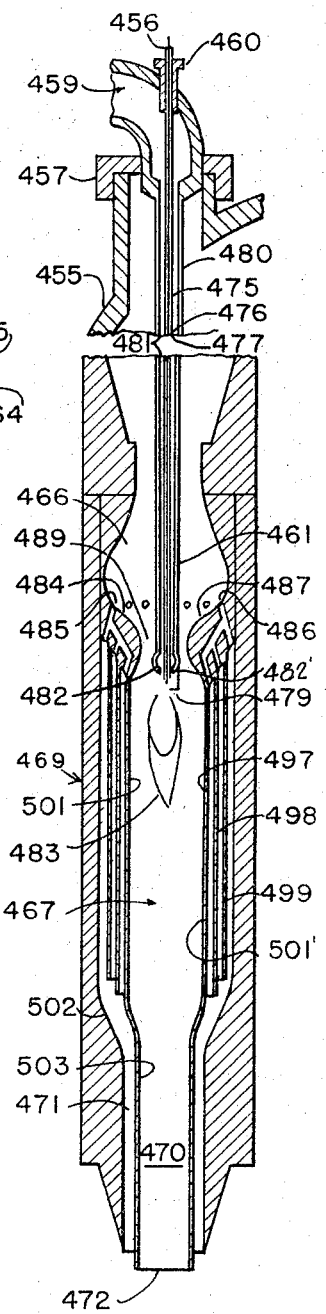
Figure 42:
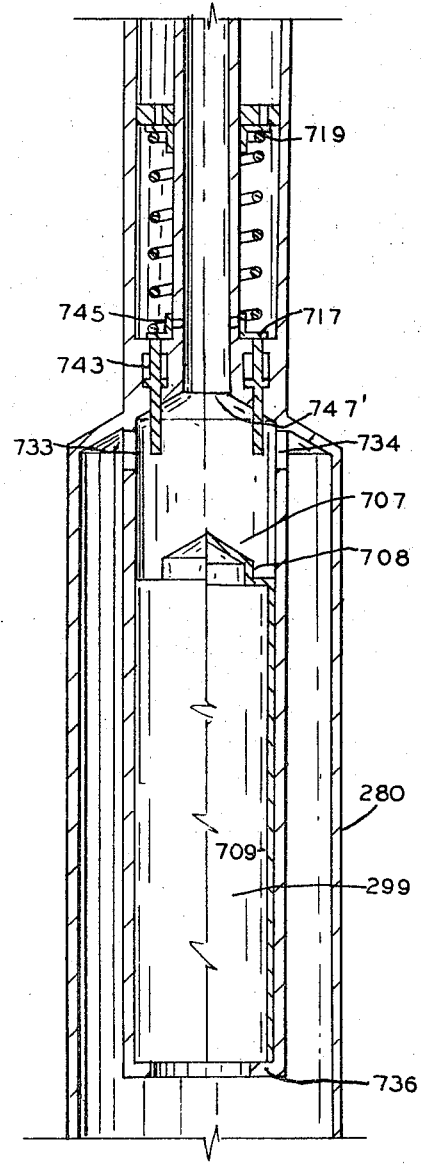
Figure 43:
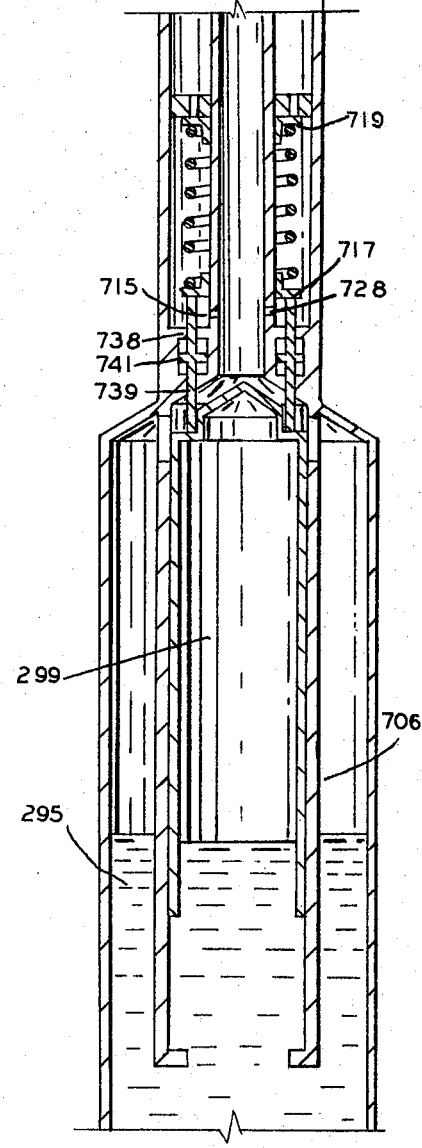

FIGURE 5 is a diagrammatic showing of the conditions in an assembly during the period of exhaust to the atmosphere from combustion and compression cylinders, such assembly comprising the same components as shown in FIGURE 1 and, also, including a supercharger system, a mechanical drive unit permitting the entire assembly to be self-propelled, and modifications providing that the pump unit shown in FIGURE 1 may be operated in the inverted position;

FIGURE 6 graphically illustrates the pressure-time relationships in the combustion chamber of the pump assembly of FIGURES 1 through 5;

FIGURE 7 is a central transverse cross-sectional view of the rotary injection valve and a longitudinal cross-sectional view of the combustion cylinder head and chamber of this invention as seen along a plane normal to the axis of rotation of the body of said valve, said plane being indicated by the line between arrows 7'-7" in FIGURE 8, the direction of this view being given by the direction of the arrows 7' and 7";

FIGURE 8 is a view of the body and housing of the rotary injection valve, partly in longitudinal cross-section along line 8'-8" of FIGURE 7 and partly broken away, as seen along arrow 18;

FIGURE 9 is a perspective view of the rotary injection valve and housing, partly broken away and showing the section seen along plane 9'-9" of FIGURE 7;

FIGURE 10 is a central transverse cross-sectional view of the exhaust valve, along the plane indicated by line 10'-10" of FIGURE 11;

FIGURE 11 is a central longitudinal cross-section view of the exhaust valve, taken along the plane indicated by line 11'-11" of FIGURE 10;

FIGURE 12 is an over-all perspective view partly broken away of a preferred embodiment of a pumping apparatus according to FIGURE 1 of this invention;

FIGURE 13 diagrammatically shows in sectional view an alternative embodiment of the pump assembly of this invention;

FIGURE 14 is a diagrammatic longitudinal cross-section representation of an assembly comprising the same air compressor and valve sub-assemblies as in FIGURES 1 through 11, and, also, including modifications of the pump sub-assembly 22 for use of this assembly as a downwell pumping unit, said assembly being shown in the combustion chamber condition and timing and valve sub-assembly position corresponding to FIGURE 1;

FIGURE 15 is a diagrammatic longitudinal cross-section representation of components of the assembly of FIGURE 14 in the combustion chamber condition and valve assembly position corresponding to FIGURE 3;

FIGURE 16 is a diagrammatic longitudinal cross-section representation of components of the assembly of FIGURE 14 in the combustion chamber condition and valve assembly position corresponding to FIGURE 4;

FIGURE 17 is a diagrammatic longitudinal cross-section representation of components of the assembly of FIGURE 14 in the combustion chamber condition and valve assembly position corresponding to FIGURE 5;

FIGURE 18 is a diagrammatic longitudinal cross-section representation of an assembly adapted for very deep well pumping, said assembly comprising the same air compressor and valve sub-assemblies as shown in FIGURES 1 through 11 and, also, including modification of the pump sub-assembly 22 for use of this assembly as a pumping unit for extremely deep wells, said assembly being shown in the combustion chamber condition and timing and valve sub-assembly position corresponding to that shown in FIGURES 3 and 15;

FIGURE 19 is a diagrammatic longitudinal cross-sectional representation of components of the assembly of FIGURE 18 in the combustion chamber condition and valve and timing assembly position shown in FIGURES 1 and 14;

FIGURE 20 is a diagrammatic longitudinal cross-sectional representation of an assembly comprising the same air compressor and valve sub-assemblies as in FIGURES 1 through 11 and, also, including modification of the pump sub-assembly for the use of this assembly for fracturing downwell formations, said assembly being shown in the combustion chamber condition and timing valve sub-assembly position corresponding to FIGURE 3;

FIGURE 21 is a representation of components of the assembly of FIGURE 20 in the combustion chamber condition and valve and timing sub-assembly position shown in FIGURE 5;

FIGURE 22 illustrates a modification of the device of FIGURE 20;

FIGURE 23 is a diagrammatic longitudinal cross-section representation of an assembly comprising the same air compressor and valve sub-assemblies in FIGURES 1–11 and, also including modification of the pump sub-assembly for use of this assembly to selectively pump one—in this case the lower of two—of a plurality of liquid producing zones penetrated by one well casing, said assembly being shown in the combustion chamber condition and timing and valve assembly position corresponding to FIGURE 3 for the lower of said zones;

FIGURE 24 is a diagrammatic longitudinal cross-section representation of components of the device of FIGURE 23 during pumping of the lower liquid zone and in the combustion chamber condition and valve and timing sub-assembly position corresponding to FIGURE 1;

FIGURE 25 is a diagrammatic longitudinal cross-section representation of the assembly of FIGURE 23 during pumping of the upper liquid zone, the combustion chamber condition and valve and timing sub-assembly position corresponding to FIGURE 3 above-described;

FIGURE 26 is a diagrammatic longitudinal cross-section representation of components of the device of FIGURE 23 during pumping of the upper liquid producing zone and in the combustion chamber condition and valve and timing subassembly position corresponding to FIGURE 1;

FIGURE 27 is an overall view of a ram jet assembly to be used with apparatus herein disclosed;

FIGURE 28 is an enlarged diagrammatic longitudinal cross-sectional view of some portions of the device of FIGURE 17;

FIGURE 29 is an enlarged diagrammatic longitudinal cross-sectional view of the dual completion valve 421 used in the assembly of FIGURES 23 through 26;

FIGURE 30 is an enlarged view of a reed valve to be used in the air compressor subassemblies of this invention;

FIGURE 31 is a diagrammatic view of the combustion and hydraulic power system shown separately of a hydraulic engine 601;

FIGURE 32 is a diagrammatic view of the air compression and valving system of the hydraulic engine 601;

FIGURE 33 is a diagrammatic view of the engine 601 during the initial part of the period during which intake and upward movement of liquid occurs in the combustion chamber and air intake occurs in the air compression chamber;

FIGURE 34 is a diagrammatic representation of conditions in the engine assembly of FIGURE 33 during the period following the upward motion of liquid in the combustion chamber there shown and during which following period compressed air and fuel are injected into the combustion chamber;

FIGURE 35 is a diagrammatic showing of conditions in the engine assembly of FIGURE 33 in a stage subsequent to that of FIGURE 34 during the initial part of the power stroke and downward motion of the liquid in the combustion chamber of apparatus 601;

FIGURE 36 is a diagrammatic showing of conditions in the engine assembly of FIGURE 33 during a stage of its operation following that shown in FIGURE 35 and illustrating the initial portion of the period of charging of the air compression cylinder by energy of the exhaust gases discharged from the combustion chamber of the apparatus of FIGURE 33;

FIGURE 37 is a diagrammatic showing of conditions in the assembly of FIGURE 33 following the period of charging of the air compression cylinder by exhaust gases discharged from the combustion cylinder and during the period of exhaust to the atmosphere from compression and combustion cylinders;

FIGURE 38 is a diagrammatic representation of the motor and powered units carried in a hydraulically powered car according to this invention;

FIGURE 39 is a perspective and diagrammatic broken away view of a hydraulically powered car according to this invention;

FIGURES 40, 41, 42, and 43 are, respectively, enlarged views of the landing head subassembly 701 as shown in zone 702 of FIGURE 14;

FIGURE 40 is a diagrammatic longitudinal cross section representation of components of subassembly 701 in the combustion chamber condition corresponding to that shown in FIGURE 14;

FIGURE 41 is a diagrammatic longitudinal cross section representation of the assembly of FIGURE 40 in the combustion chamber condition and valve position corresponding to that shown in FIGURE 15;

FIGURE 42 is a diagrammatic longitudinal cross sectional representation of component subassembly of FIGURE 40 in a combustion chamber condition and valve assembly position corresponding to FIGURE 16;

FIGURE 43 is a diagrammatic longitudinal cross section representation of component of subassembly of FIGURE 40 in the combustion chamber condition and valve assembly position corresponding to FIGURE 17.

The major functional subassemblies of the pump unit of FIGURES 1–11 comprise the air compressor subassembly shown in the dotted area 21 of FIGURE 1, the pump subassembly shown in the dotted area 22 of FIGURE 1, and the timing and valve assembly as shown in dotted area 23 of FIGURE 1.

The air compressor subassembly 21 comprises a fluid reservoir chamber 25, compressor cylinder 26, inlet check valve 27 and outlet check valve 28 therefor, air supply tank 29, and an exhaust gas line 30. Fluid reservoir chamber 25 is a closed container. It contains fluid— as water—therein, upwardly extending from said chamber and the liquid therein is the air compressor cylinder chamber 26; the interior of chamber 25 and cylinder 26 communicate through the bottom portions thereof only, below the lower projecting portion of wall 24 of cylinder chamber 26, as shown. The air compressor cylinder chamber 26 has it its top an inlet check valve, 27, and an outlet check valve 28. The outlet of valve 28 operatively connects and discharges into air supply tank 29. The top of chamber 25 is provided with an exhaust gas line 30 which connects the interior of chamber 25 to the exhaust valve and rotary injection valve, as hereinbelow described.

The pump engine sub-assembly 22 comprises a fluid suction pump 33, a fluid suction inlet line 34, a suction valve 35, combustion cylinder 36, cylinder inlet 38, discharge valve 39, discharge manifold 40, discharge surge tank, 41, and a discharge line 42. Fluid suction pump 33 is positioned in the fluid suction inlet line 34; one-way inlet or suction valve 35 is located in that line adjacent to and supplies fluid into combustion cylinder 36. At the top of the cylinder 36 is cylinder inlet 38; combustion chamber discharge valve 39 is provided with a valve which is open during a pressure difference thereacross causing a flow of fluid therepast outwardly and automatically closes when such pressure differential ceases; this valve opens to discharge manifold 40 which in turn connects to a discharge surge tank, 41, which supplies the high pressure discharge line 42.

The timing and valve sub-assembly 23 comprises, an ignition system, 43, a rotary injection valve, 44, a rotary exhaust valve, 45, a variable speed control motor 46, equalization piston 48 and bleed off 47, a suction valve control system 49, and a discharge valve control 50.

The ignition system is a conventional coil ignition system provided with a spark plug 37 attached to the combustion cylinder inlet 38. The rotary injection valve 44 is attached to the top of the combustion cylinder and is provided with openings for passage of gaseous mixtures into said cylinder, and for passage of gases from said cylinder to the rotary exhaust valve 45. The rotary exhaust valve is operatively connected to the rotary injection valve and to the exhaust line 30 of and to the atmosphere or, as described below, to a supercharging system. A variable speed control motor 46 drives the rotary injection valve and the exhaust valve and the ignition system to provide for the rotation of said valves as below described and for an electrical discharge across the spark plug 37 when the rotary injection valve body presents to combustion cylinder inlet 38 a solid surface and thereby closes off exits from the top of said combustion cylinder prior to igniting of the fuel-air mixture in the combustion cylinder.

The rotary injection valve comprises a housing 51 with a valve body 52 therein. The rotary injection valve housing is provided with a cylindrical cavity 88 therein for a valve body 52; the valve body is generally cylindrical in outline and rotatably fits in said cavity; the body has several passages and chambers therein; it has a diametral air passage 53 with its length transverse to the longitudinal axis of the valve body; the passage is rectangular in cross-section—with rounded edges however—and its cross section is longer in the direction of said longitudinal axis than in the direction transverse thereto.

Figure 2:
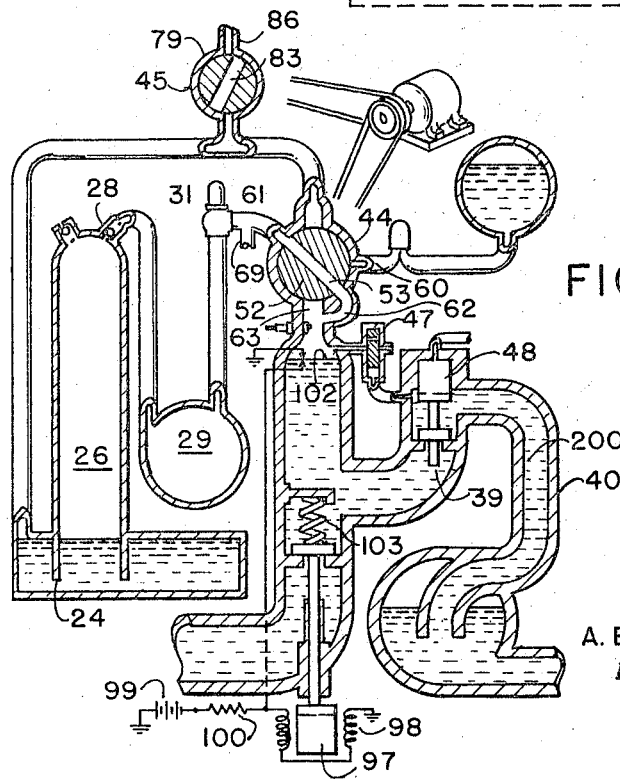
FIGURE 2 is a diagrammatic representation of conditions in the assembly shown in FIGURE 1 during the period following upward motion of liquid in the combustion chamber and during which period compressed air and fuel are injected into the combustion chamber.

This passage connects housing air inlet 61 and fuel air injection line 62 of the housing when said valve body is oriented as shown in FIGURE 2, discussed below. Spaced longitudinally along said longitudinal axis of said cylindrical valve body a distance from the central longitudinal axis of the passage 53 is an exhaust passage 54 in said valve body; this passage is cylindrical in cross section and matches the inlet and outlet passages 63 and 65 of the valve housing, below described; cylindrical passage 54 has a central longitudinal axis which is diametral with respect to the cylindrical valve body 52; passages 53 and 54 are sufficiently spaced to avoid any contact between the walls thereof.

The longitudinal axis of passages 53 and 54 are at an angle to each other to provide for the sequence of connections below described for the cycle of operation shown in FIGURES 1–5, below described.

A fuel recess is provided in the valve body 52; this recess has an opening to the surface of said body.

The housing 51 for the rotary injection valve has an exterior opening for air inlet passage 61 on the top of said housing and an interior opening to the cavity 88 within said housing; fuel-air injection line 62 has an opening in said cylindrical housing cavity: these openings to the housing cavity are connected through passage 53 of the valve body only when such body is in the position below described for FIGURE 2. Neck 63 of the housing has one orifice which opens to the cylindrical cavity 88 in the valve housing, another orifice whereat line 62 opens thereinto, and another orifice connected to the combustion chamber inlet 38. A passage 65 provides, with passage 54 oriented as shown in FIGURE 8, for movement of exhaust gases to the exhaust valve 45 from the combustion chamber via neck 63 of the housing. The housing lubricant outlets open to the housing cavity 88 and open to the exterior of the housing, as inlet 66, and the lubricant is distributed by passages in the housing, as 67, to the surface of the valve body 52.

Fuel line 60 enters passage 68 in the housing and carries fuel therethrough to the fuel chamber 55 in the valve body. The housing is provided with a fuel transport passage 57' at one end of which is located orifice plate 58, and the other end of said passage opens to the cavity 88 in said housing; a passage 57" passes from an adjacent opening in said cavity to the exterior of said housing whereat is located fuel-air line 69. Recess 55 is placed in the valve body so that the opening thereof on the surface of the valve body covers the openings into cavity 88 of passages 57' and 57". Accordingly, when the fuel chamber 55 provides for connection of passages 57' and 57" air fed from fuel-air line 69 into fuel transport passage 57' flows into chamber 55, mixes with the fuel therein—either gaseous or liquid—forming a mixture therewith which is carried through passage 57" to orifice 58 and there that fuel-air mixture is sprayed into the fuel-air injection line 62.

The valve body is held in the housing by end plates on the housing and shaft 56 serves to turn the valve body in the cavity 88 in timed relation with exhaust valve 45 and ignition system 43 all driven by motor 46 at such speed as is desired, e.g., about 50 r.p.m.

Valve housing 51 is provided with a coolant inlet 70 matching coolant inlet 71 of the valve body. The housing further is provided with a coolant outlet 72 corresponding with the coolant outlet 73 of the valve body. The valve body coolant inlet connects to the coolant inlet chamber 74 which in turn connects to the central chambers 75 on the other side of the valve body and coolant outlet chamber 76. The drive shaft 56 provides for movement and control of the position of the valve body relative to the housing.

Exhaust valve housing 79 is provided with a cylindrical cavity wherein cylindrical exhaust valve body 80 rotatably yet firmly fits.

The exhaust valve 45 comprises a housing 79 and a valve body 80. A drive shaft 81 on the body provides for control of the position of said body. The body has an exhaust passage 83 which connects to the exhaust line 30 by neck 85 and exhaust discharge 86. Coolant inlet 87 of housing 79 provides coolant to the exhaust valve body coolant passages 89, and hence to the exhaust valve housing passages 90 to exhaust valve housing outlet 91. Passage of coolant through these passages helps maintain the temperature and dimensional stability of these valves and preserves the tolerances necessary for close sealing fit and proper operation of the assembly.

The conditions occurring in the pumping, compressor, and valve assemblies during each of the two strokes which form one cycle of operation are illustrated in FIGURES 1 through 5. Generally, during each cycle of a pump unit, according to this invention, the fluid to be pumped is introduced by the suction line pump 33 to the suction valve 35 filling the combustion cylinder 36, is discharged under the influence of combustion in the combustion cylinder through the discharge valve 39, and flows through the manifold 40 into the surge tank 41 and out through the common discharge line 42.

FIGURE 1 illustrates a point in the operational cycle which may be regarded as the beginning of such cycle for purposes of description. At the point illustrated in FIGURE 1, the rotary injection valve body is positioned so that the exhaust passage 54 therethrough provides for free movement of combustion gasses from the combustion cylinder to the exhaust valve 45 where passage 83 is then in its full open position. Concurrently, exhaust gasses pass from the fluid reservoir box 25 through the exhaust gas line 30 to and through the exhaust valve 45 and passage 83. These gasses were initially exhausted from the compression and combustion cylinders by the pressure therein, which pressures were those applied by the weight of fluid 94 in the compression cylinder and the pressure of gas, 95, thereabove in cylinder 26, as shown in FIGURE 5, as well as the pressure—equal to discharge line back pressure—existing in combustion cylinder 36. At the moment shown in FIGURE 1, the expelling force is only the pressure of suction pump 33 in cylinder 36 and the difference in height between the level of the column of liquid, 94, in the compressor cylinder and the level of such fluid in the fluid reservoir box 25. At the moment shown in FIGURE 1, fresh air enters the compressor cylinder through inlet check valve 27 while back pressure in the air supply tank 29, which pressure is predetermined by the setting on pressure regulator 31, holds the outlet check valve 28 closed, while fluid enters the combustion cylinder through suction valve 35 which has been opened by the positive pressure provided by the solenoid 97 operating against spring 103, as shown in FIGURE 1. During the moment illustrated in FIGURE 1, the water level is rising in the combustion cylinder as shown by the arrows at the fluid level 94, and falling in the compression cylinder. The suction valve 35 is held in the open position against spring 103 by the suction valve control system 49: this system comprises solenoid 97 and a solenoid circuit, 98; this circuit comprises a series connected E.M.F. source 99, resistor 100, and a fixed astatic gap 101, connected to the circuit so as to short out the solenoid when fluid in the compression cylinder rises to a desired level, 102, in the cylinder. Thereupon the solenoid is deenergized and the spring 103 closes the suction valve against the suction line pressure. The astatic gap switch provides a control of fluid level to within plus or minus 1/32 inch.

The rotary injection valve and exhaust valve rotate continuously under the energization of the variable D.C. timing motor 46. Accordingly, the rotary injection valve is rotated past the position shown in FIGURE 1 to the position shown in FIGURE 2. In this position exhaust passage 54 is closed off from passages 63 and 65 in housing of the rotary injection valve. At this time the air injection passage 53 in the valve body 52 is brought in line with the passages 61 and 62 therefor in housing 51. Thereupon, as shown in FIGURE 2, air from the supply tank 29 (at 100 to 200 p.s.i.g. in the embodiment below described in detail) passes, serially, through the pressure regulator 31—set to close at from 100 to 200 p.s.i.g.— air line 61, valve body air inlet passage 53, valve housing passage 62, and hence, into the inlet 38 and interior of the combustion cylinder 36. Concurrently air passes from line 69 to mix with the fuel theretofore held in the fuel chamber 55 and as shown in FIGURE 9 carry the thus-formed mixture through the fuel transport passage 57' to the orifice plate 58 and there form a spray of said mixture into the stream of air passing through the passage 62.

The fuel-air mixture so made swirls into the combustion cylinder from the air inlet line 62 past the points of spark plug 37 and, therefrom, into the combustion chamber. This flow of fuel-air mixture serves to remove any moisture which may have gathered on the points of the spark plug and forms a compressed air-fuel mixture in cylinder 36. At this point in the operational cycle shown in FIGURE 2 the level of water in the compressor cylinder 26 has reached the level in the fluid reservoir box 25.

As shown in FIGURE 3, continued rotation of the rotary injection valve body, via its drive shaft 56, closes off the air inlet passage 53 from the feed and outlet passages therefor in the rotary injection valve body housing 51 and also closes off fuel-air line (69) passage from its connection with the interior of the combustion chamber. The rotary injection valve housing is provided with a breather slot 64 whereby to bleed off to the atmosphere the air under pressure trapped in the fuel chamber 55 prior to refilling said chamber by the fuel supply.

The ignition system 43 is a part of the timing and valve assembly and is, as in conventional systems, through condensers, capacitors, and breaking points, timed to deliver a high tension spark to spark plug 37 after the above-described closing off of the air passage 53 and the fuel air line 69 from the combustion chamber. The spark initiates combustion in the combustion chamber, then filled with the compressed fuel-air mixture previously added. Pressures needed to pump the liquid—over 800 pounds per square inch in the embodiment below described—are thereby developed in the combustion chamber and the fluid in the combustion cylinder passes out through the discharge valve 39 and, thence, into the discharge manifold 40 and the surge tank 41. The discharge of fluid from the combustion chamber continues until the combustion chamber pressure no longer exceeds the discharge pressure and the fluid momentum is dissipated, whereupon the discharge valve is closed, as shown in FIGURE 4.

As shown in FIGURE 4, the continued rotation of the valves 44 and 45 by the timing motor brings the exhaust passage 54 of the rotary injection valve body to connect the interior of the combustion chamber with the exhaust opening 65 and line 30, while the rotary exhaust valve is still in the closed position. Accordingly, the exhaust gases from the combustion cylinder, under approximately the same pressure as the discharge pressure in manifold, 40, expand and force fluid 94 in the reservoir box and air 95 thereabove upwardly at high pressure. The air 95 flows past the outlet check valve 28 into the air supply tank 29. Thereby the gases in the compression chamber 26 are substantially all transferred to the air supply tank 29. The rotary injection valve and rotary exhaust valves are kept open by the timing control concurrently for a sufficient period of time to bleed the compressor fluid reservoir box 26 and the combustion cylinder 36 substantially to atmospheric pressure after this transfer.

The volume of the fluid in the fluid reservoir box 25 above 24, the lower end of the compression cylinder, will not quite fill the compressor cylinder thereby preventing excessive expansion of the exhaust gases from discharging compressor fluid into the air supply tank. The amount of such liquor in the fluid reservoir box, including variations due to condensation and evaporation, is compensated for by a conventional fluid level regulating system.

Thereafter, the timing motor drives the rotary exhaust valve to the position shown in FIGURE 5 at which point exhaust valve passage 83 connects line 30 to the atmosphere and the gasses under pressure in the reservoir box 25 and in the combustion chamber will exhaust to the atmosphere or to a pump, as 264 in FIGURE 5, for precompression of air passing to the compressor cylinder using the energy of these exhaust gasses.

The pressure in pump cylinder 36 thus drops to atmosphere which is below the pressure in pump suction line 34. This change in pressure permits the energizing solenoid 97 on the suction valve control system to overcome the action of suction valve spring 103 and opens the suction valve 35. Thereupon fluid enters the combustion cylinder 36.

When the pressure in the compressor reservoir box 25 drops to atmosphere or below the amount required to close the inlet check valve 27 the level of the fluid column 94 within compressor cylinder 26 drops, taking in fresh air through the inlet check valve 27.

Following this, the movement of the valves 44 and 45 effects the conditions and operations above-described for FIGURE 1, thereby completing the cycle of operation on each 180° of rotation of the exhaust and injection valve bodies.

The pressure-time relationships of FIGURE 6 indicate the relative times of the various portions of the above-described cycle and the pressure in the combustion cylinder 36 during such periods, in a typical operation of the method and apparatuses of this invention.

Transducer measurements of the discharge pressure in the discharge line control the speed of the D.C. motor 46, and so vary the number of revolutions per minute of the valves 44 and 45, and so maintain a constant discharge pressure in the line 42 against a varying load. Further, over-pressure safety switches in the discharge line, as at 105, stop the D.C. motor instantly to provide a high degree of operational safety.

During starting discharge line pressure would be negligible under most operating conditions. Injection of a compressed fuel-air charge into the combustion cylinder 36 would then discharge fluid from that cylinder prematurely. Therefore, an equalization system is provided to hold the discharge valve 39 closed during fuel-air charge injection until the line pressure exceeds air injection pressures. Accordingly, regulated air pressure forces the rod on equalization piston 48 in discharge valve chamber against the discharge valve 39 and holds that valve shut until ignition occurs. When the discharge line pressure exceeds the regulated air pressure on top of the equalization piston then the discharge fluid pressure forces the equalization piston upward allowing the discharge valve to then function in the usual manner above-described. A manual disconnect, as 106, of this equalization system is actuated after such usual manner of operation has begun.

Additionally, a bleed-off valve assembly 47, comprising a bleed chamber, a bleed piston, and connection of said chamber to the discharge line, is provided to limit the combustion chamber pressure to a lower level during starting and so prevent the discharge of exhaust gases into the surge tank. When discharge pressure builds up, this valve will be forced upward closing off the bleed port in the bleed piston. Also, in the event of a sudden loss of discharge line pressure the bleed-off valve will again open to prevent over expansion of the exhaust gases in the combustion cylinder and the discharge thereby of exhaust gases into the discharge surge tank.

Starting is accomplished in the embodiment below described by use of a hand pump to charge the air reservoir 29 to 200 pounds p.s.i.g. The combustion chamber pressure in such embodiment is limited by the bleed-off valve as above described until the fluid output pressure equals 450 p.s.i., and the fluid discharge valves are controlled by equalization pistons as above described until the output pressure equals the air intake pressure.

A six cylinder pump made according to this invention is shown in FIGURE 12. This machine is shown as mounted on skids 109 for handling, moving, and mounting. Fluid enters through suction line 110, flows through suction valves located as at 111 into combustion cylinders as at 112. Under the influence of combustion in said cylinder, said liquor flows to the discharge valve as 114, discharge manifold 115, and into a surge tank, as 116. All six cylinders discharge into one surge tank and out through a common discharge 117. Each cylinder is a part of a pump unit comprising the pumping, timing, and compressor sub-assemblies as above described for FIGURES 1 through 5. All six rotary injection valves and all six rotary exhaust valves are rotated by a common variable-speed D.C. electric motor 121. Motor chain belt 125 from motor 121 drives sprocket-teeth on the drive shaft 126 and 122 whereby timing thereof is coordinated with such valve bodies as above-described and with the electrical spark mechanism and spark plug as 43, in the manner above described for FIGURES 1 through 5.

A drive shaft 122 operates the rotary injection valves 123 and drive shaft 126 control the exhaust valves as 127. An exhaust line, as 129, provides for exhaust. The fluid reservoir box 130 is connected to air supply tank 131 which is in turn connected to the rotary injection valve. Exhaust gas line 132 connects to the rotary exhaust valve 127 and injection valve 123 in the manner above diagrammatically illustrated in FIGURES 1 through 5. The air compressor 135 is provided with an inlet check valve 136 and the outlet check valve 137.

A particular example of operation of the above-described embodiment according to this invention produces an output of 800 gallons per minutes at 800 p.s.i.g., or 375 hydraulic horsepower. The fuel used in such an apparatus is commercial propane with a heat value of, for example, 19,994 British thermal units per pound at a specific weight of 4.24 pounds per gallon at 68° F. and 123 p.s.i. About 160 pounds of such fuel are used per hour for the total six cylinder engine. The vapor pressure of such fuel material would be 124 p.s.i. at 70° F., 167 p.s.i. at 90° F., 192 p.s.i. at 100° F. Such fuel has an ignition temperature of 920° F. to 1020° F., and between 4.2% and 4.5% of such gas in the air gives flame temperature of over 3600° F. The actual thermal efficiency on such apparatus is about 35%. The fuel rate per pulse is .00444 pound per pulse or a total of 159.8 pounds per hour. The air weight per pulse is .0686 pound per pulse or a total of 2,470 pounds per hour. The theoretical horsepower is thus 1,113.7 H.P. and provides an estimated thermal efficiency of 35.9%. The approximate gross weight of the pump unit is 3,500 pounds and the approximate gross weight of the compressor is 3,000 pounds. The optimum valve speed is 50 r.p.m. and is, of course, adjustable to rotate at 50 r.p.m. or as high as 100; this 5 r.p.m. value speed provides 100 cycles per minute. Venting the exhaust gases from the rotary exhaust valves through a turbine section of a supercharger, forcing air from the compressor section of the supercharger through the inlet check valve of the compressor cylinder, as described for embodiments of FIGURES 5 and 13, results in efficiencies exceeding those of conventional diesel engines.

The compressor cylinder in such embodiment has an internal diameter of about 7⅝ inches (45.66 square inches cross-section) and a stroke of about 7¼ inches for a total displacement of 1991 cubic inches and a compression ratio of 11.1.

The valve body on exhaust and on rotary injection valves is made of stainless steel (440C) hardened and finely machined to plus or minus 1/10,000 inch after the machine and grinding work thereon had been done. Such valve bodies have thermal coefficient of expansion slightly less than that of the mild steel valve housing. Full pressure lubrication is obtained with molybdenum disulfide emulsified in a silicone-phosphate vehicle.

The rotary injection valve body used in the above described embodiment is cylindrical; it has a diameter of 4 inches and a length of 6 inches. Transverse to the longitudinal axis of said cylinder fairly in the center of said valve is located the axis of the exhaust passage 54, said exhaust passage having a diameter, in the above embodiment, of 1½ inches, which corresponds to the internal diameter of the exhaust line 65.

The air inlet passage 53 is rectangularly slot-shaped, as shown in FIGURE 7, to provide a long path for the spray of fuel from passage 57 and to shorten the time required for the injection of the fuel air-charge. The longitudinal axis of passage 53 is parallel to the plane of the exhaust passage through the rotary injection valve and also in a plane normal to the longitudinal axis of that valve body. The central longitudinal axis of this air inlet passage is at 90 degrees to the central longitudinal axis to the exhaust passage in that valve body.

The rotary injection valve housing 51 provides ports for such air inlet passage at 30 degrees to the exhaust passage axis as shown generally in FIGURES 8 and 9, whereby the time relationships above described are effected. The fuel chamber 55 has a sufficient volume (about 0.25 cubic inch in the preferred embodiment) to provide the amount of energy needed per unit stroke.

Water cooling is effected through the inlet ports 70 in the rotary injection valve body through the coolant inlet chamber 74 on the left of FIGURE 8 and around the exhaust passage 54 to central coolant chamber 75 and then again past the air inlet passage and to coolant outlet chamber 76 and a cooling outlet 72. The exhaust valve is similarly cooled. A water jacket 141 is provided for the combustion chamber housing 142 and rotary injection valve housing 51. It should be noted that, notwithstanding the pressure of about 800 p.s.i. developed in the combustion chamber, and the high instantaneous ignition flame temperatures, as shown in FIGURE 3, said total force bearing on the valve body is borne by the rotary injection valve over an area substantially larger than that to which the 800 p.s.i. existing in the combustion chamber is applied. Accordingly, in combination with temperature control, close machining and high pressure lubrication, entirely adequate sealing against loss of pressure gases is effected.

According to this invention high fluid pressures can be developed to overcome the starting loads imposed upon the hydraulic motor. As torque requirements to move the load increases pump displacement according to the device of this invention may be increased, using higher r.p.m. of the hydraulic motor.

Pressure produced by the method and apparatus of this invention can presently be readily furnished up to 2,000 pounds per square inch. Increase of the pressure with which the fuel supply is passed to the fixed volume fuel chamber 55 or increase of the size of said chamber on the rotary injection valve provides for a greater weight of fluid moved per each revolution of the rotary injection valve body. Also, the variable speed D.C. motor may increase the rate of rotation of the exhaust and injection valves. Accordingly, a great variation in the output energy of the machine is achieved by increasing either fuel-air injection pressure or weight of fuel combusted or increasing the rate of constant composition air-fuel mixture consumption by increased r.p.m. of the valves. It will also be noted that in the device of this invention moving parts are reduced to a minimum. Also, bringing the fluid pistons to the same level in the engine cylinder on each cycle and injecting the fuel-air charge under predetermined regulated pressure allows the injection of the same quantity of fuel and air in each cycle regardless of the speed of operation. Cams are not needed and the only wearing surfaces are in valves 45, 44, 35, and 39.

The device of FIGURE 12 is only seven (7) feet long, 66 inches wide and 66 inches high, and has the characteristics given in Table I hereinbelow.

In FIGURE 12, the water jacket 141 for the three cylinders discharging into manifold 115 is shown partly broken away to illustrate some of the interior relations thereof; corresponding jacket 141' for the other three cylinders discharging into manifold 115' is shown in its usual position. Cooling line 140 feeds fluid—as water—into jacket 141 to cool cylinder head 142, as by water 143 in said jacket and cools the lower cylinder walls 144 by flowing through the cooling chamber between jacket 141' and said wall. By such cooling the dimensional and structural characteristics of the valve and combustion cylinder are maintained notwithstanding the use of the elevated flame temperatures concomitant on the ignition of combustible fuel-air mixtures as above described injected into a combustion cylinder at pressures of 200 p.s.i.g. and upward. The known advantage of high temperature and high thermal and economic efficiency concomitant on use of such high combustion temperatures are readily permitted by the use of an injection valve as 44, as above described, which permits high pressures to be used in the combustion chamber safely and efficiently, without the wear and fatigue problems concomitant on use of reciprocating valves. Valve 44 provides a large bearing surface to withstand those forces which the valve surface open to the combustion chamber during combustion must withstand under high temperatures provided by use of igniting high pressure fuel-air mixtures. A 20 mesh tungsten screen, 144, is provided in the flange at neck 38 to protect the valve face and other structures otherwise directly exposed to the combustion reaction.

It will be noted that the device of this invention is able to tolerate suspended abrasives, and avoids high rotational speeds and use of packing glands and wear rings by direct conversion of the heat energy of fuel directly into hydraulic energy. A 375 hydraulic horsepower pump unit made according to this invention described above and shown in FIGURE 12 replaces a skid mounted oil field mud pump unit and its power plant which will displace 800 gallons per minute at 800 pounds per square inch. A comparison of these two units is made in the following Table I.

TABLE I

| Pump Unit | 600 b.h.p. Engines 7¾" x 16" Pump | 6 Cylinder 375 h.h.p. Pump of this Invention |
| --- | --- | --- |
| Displacement | 800 g.p.m | 800 g.p.m. |
|  | 800 p.s.i | 800 p.s.i. |
| Gross Weight | 60,000 pounds | 7,500 pounds. |
| Overall Dimensions | 24' x 8' x 6' | 7' x 5' x 6'. |
| Initial Cost | $75,000.00 | $45,000.00. |
| Estimated Monthly Maintenance | $1,000.00 | $100.00. |
| Total Moving Parts | 2,000 | 100. |

An alternative embodiment of this invention is shown in FIGURE 13, wherein the compressor and the combustion chamber operate with U-shaped chambers to take advantage of the oscillation period of the liquid in such chambers. Orifice plates are provided to more closely control the frequency characteristics of such oscillations. In this embodiment, a gas discharge is effected and a floating check piston is used rather than the astatic gap above described for control of the intake valve to the combustion cylinder.

The apparatus of FIGURE 13 is another embodiment of the process of this invention. It comprises an air compressor sub-assembly 145, a generally U-shaped engine sub-assembly 146, a turbine supercharger 158 and a valve and timing sub-assembly as 23 discussed above all cooperating as one assembly.

The air compressor sub-assembly 145 comprises a U-shaped tank 147 with vertical upstanding cylindrical arms 148 and 149 joined by a hollow C-shaped portion 190: each arm, except as below described, is closed at its top. The C-shaped portion is filled with liquid 162, and said fluid extends, at rest, to level 163' in arm 148 and to level 163" in arm 149 when that liquid is at rest; levels 163' and 163" each extend to one-half way up the height of the vertical portion of said vertical cylinders. The top of arm 148 is closed to form a chamber 148'. The top of that chamber opens to a one-way inlet valve 167 into which inlet line 166 feeds. A one-way discharge valve 150 is also located at the top of chamber 148' and connects the interior of said chamber to compressed air discharge line 151.

The top of arm 149 is closed to form a chamber 168; line 165 connects the top of that chamber to the rotary exhaust valve 155 of the valve and timing sub-assembly 23 of this assembly. A valve 168' in chamber 168 has a floating ball which prevents passage of liquid 162 into line 165; but such does not interfere with the passage of gas to and from line 165. Chamber 148' is connected through a one-way discharge check valve 150 and line 151 to an air reservoir tank 152; air tank 152 connects and discharges through a line 153 and pressure regulator 153' (set at 200 p.s.i.g. in the preferred embodiment) to a rotary injection valve 154 of a valve assembly 23 which acts, as shown in FIGURES 7, 8, and 9, as valve 44 of assembly 23 of FIGURES 1–12 to pass air and fuel to the combustion chamber 160 below described by operations the same as those above described for the embodiment of FIGURES 1 through 12. The discharge of the exhaust valve 155 in this embodiment is connected to the turbine wheel 157 of supercharger 158 at the air intake of which is a compressor wheel 159 which supercharges the air passing to the air compressor chamber 148'. The U-shaped engine sub-assembly 146 has a right hand upright cylindrical discharge arm 171 connected to air supply tank 172, and a left hand upright cylindrical combustion chamber arm 173 connected to the rotary injection valve 154. Arms 171 and 173 are vertical right cylinders upwardly directed and closed, except as below described, at their tops and are open to and connected at their bottom by a C-shaped hollow portion 174. Fluid 158 fills the C-shaped portion and extends, at rest, to level 191 in arm 171 and to level 193 in arm 173. Levels 191 and 193 each extend one-half up the height of the vertical portion of each of said vertical cylinders. The top of chamber 173 is connected to the rotary injection valve 154 of sub-assembly 23 in the same manner as combustion cylinder 36 is attached to rotary injection valve 44 in FIGURES 1–12. The top of chamber 171' formed at top of closed arm 171, is connected to an inlet line 198' and line 166' from the supecharger fan 159 through a one-way inlet valve 166''; the top of the chamber 171' is also connected by one-way discharge valve 172' to air supply tank 172 which holds a reservoir of high pressure gas in the same way surge tank 41 holds high pressure fluid. One-way discharge valve 172'' on top of chamber 171'' provides for compression of the gas as 194 in chamber 171' above the level of the liquid 158 in arm 171, and discharge of such compressed gases only when the pressure in the reservoir 172 is exceeded by the pressure of the gas overlying the liquid 158 in the arm 171. A regulator 195 is attached to the discharge line 196 of the tank 172, and holds that pressure at about 800 p.s.i.g. in the preferred embodiment.

The portion of the chamber 173 above the liquid level 193 in closed arm 173 is referred hereinafter as combustion chamber 175; it has an inlet 161 like inlet 38 of chamber 36 hereinabove.

In the beginning of the cycle using the device of FIGURE 13, the rotary injection valve 154 (identical in structure to valve 44 above-described) moves to the position whereat communication is made between the inlet 161 of the combustion chamber 175 and the exhaust line 165 as shown in FIGURES 1, 7, and 8. At this time, also, the rotary exhaust valve 155, identical to valve 45 of FIGURES 1–12 is full open in FIGURES 10, 11, 5, and 1 above. Air from the supercharger 158 then moves fresh air into line 166 past inlet valve 167 and into chamber 148'; thereupon fluid 162 in the air compressor tank 147 moves from the static of rest levels 163' and 163'' to the levels shown as 164' and 164''.

Thereafter, the rotary exhaust valve 155, driven by motor 156, closes and the rotary injection valve 154, also driven by said motor, passes to a position as shown for valve 44 and 45 in FIGURES 2 and 9 above, fuel passed to valve 154 from its storage source 178 and is admixed with air and a combustible fuel air mixture is injected into the combustion chamber 175, as above described for valve 44.

Under the influence of the driving D.C. motor 156, the rotary injection valve 154 then closes off air line 153 and the ignition system, as 43, is activated: ignition of the spark plug thereof as 169 then occurs and causes combustion of the fuel-air mixture and increased pressure in cylinder 175 by the resultant combustion gases; the resultant expansion of those gases forces the fluid 158 in combustion chamber 175 from level 197 down to level 170 and moves fluid on the right hand arm 171 from level 197' up to the level 164''. This compresses the air in chamber 171' and discharges the thus-compressed air from chamber 171' to the air-supply tank 172. The residual thus—compressed gas in chamber 171' is held at pressure of chamber 172—usually 800 p.s.i.g.—by check valves 172' and 166''.

Following combustion and the discharge of compressed air to the air supply tank 172, the rotary injection valve 154 continues its rotary movement and the relationship of valve components as shown in FIGURE 4 for valves 44 and 45 is substantially achieved. Thereupon combustion gases from the chamber 175 exhaust to the air compressor chamber 168 via line 165 thereby forcing the fluid in arms 148 and 149 to levels 173 and 173', respectively, and thereby compressing the air in chamber 148' and discharging that thus compressed air via line 151 to the engine supply tank 152; this occurs by expansion of gases in chambers 171' and 175 initially approximately at the pressure of the line air-supply tank 172.

Thereafter, when the rotary injection valve moves to the exhaust position and the rotary exhaust valve 155 opens, as above described for valve assembly 23 of FIGURES 1–12, pressure in chamber 171' completes the movement of fluid 158 from level 170 to level 197 in arm 173 and the chamber 168. Pressure on fluid 162 in the arm 149 of air compressor cylinder is thus released against the pressure in line 165 and that fluid then rises to the level 164''. Thereby the gases in chambers 175 and 168 are exhausted through the turbine wheel 157 preparatory to the next cycle of air intake and compression. A float valve 168' in chamber 168 prevents discharge of liquid 162 to line 165.

Air compressed by and discharged from compressor fan 159 passes to the air compressor chamber 148' above fluid 162—then at level 164'—via line 166 and, also by line 166' and 198' into chamber 171' of arm 171 of the engine assembly 146 above fluid 158—then at level 197'. A reservoir as 198, provided with one-way valves, as 199' and 199'' shown in line 166' may also be provided in line 166. The assembly of FIGURE 13 acccordingly provides for compression of air by liquid 158 in the arm 171 of U-shaped sub-assembly 146 and for its discharge to and storage in the chamber 172. The same high discharge pressures (as 800–2,000 p.s.i.g.) and equivalent discharge volume and efficiences (using the same fuel) are accordingly obtained with the device of FIGURE 13 as obtained with the device of FIGURES 1–12 above described.

The liquid 158 used in sub-assembly 146 or in FIGURE 5 when air is pumped may be water. However, hydrocarbon oil may vaporize and explode at the high pressures achieved in the engine sub-assembly of this device. Accordingly, relatively inert liquid of low melting point, high boiling point, and low vapor pressure and a higher specific gravity than the fluid being pumped from such sub-assembly 141 may be used; silicone base liquid plastic is preferred for air pumping, mercury for water and oil, molten lead and molten sodium for inert gases. For purposes of keeping the molten metals liquid heating electrodes as 158 and 158' are used in tube 146. The material of which the U-tubes 145 and 146 are made may be steel when air is pumped, but tube 146 should be ceramic lined when molten aluminum, lead or zic is being pumped, as into dies and the walls of said chamber are then heated by conventional means to maintain the metals fluid.

The fluid piston, as 251 shown in FIGURE 5, made of material inert to the combustion gases thereabove and the liquid therebelow as silicone plastic for air pumping, etc., may also be used in the embodiment of FIGURE 13.

The device of FIGURE 13 may pump from chamber

171' inert gases (fed via line 198') or water or oil or molten metal for use in dies.

In the preferred embodiment, orifice plates of adjustable internal diameter are provided as at 176 and 177 to control the frequency of oscillation of the liquid in each U-shaped tube as 146 and 147. Thereby the natural frequency of such columns of liquid can be utilized to provide a steady number of firings per unit of time. In such instance the power out-put is regulatable by increasing the pressure on the fuel fed from tank 178 through fuel regulator 179, e.g., a spring solenoid type, controlled by a motor control 180 sensitive to the pressure in the line air-supply tank 172 and providing for greater fuel charge when the line pressure falls and providing for lesser fuel charge to a fuel chamber in the injection valve such as 55 in the valve body as 52 above-described in relation to FIGURES 7, 8 and 9. Additionally, such control may also control the spring solenoid for air valve 153' and so regulate the weight of air admitted to the chamber 175 on each firing of the fuel therein thereby control the power output and the pressure in the line discharge 172. Additionally, a motor control 181 to control the speed r.p.m. of D.C. motor 156 may be provided to further control the power out-put if desired in relation to the pressure senses in air-supply tank 172.

The motor control and valve connections shown in the device of FIGURE 13 and the use of the turbine on the exhaust may be applied as desired to the device of FIGURE 1 and 12, as shown in FIGURE 5.

A modification of the assembly of FIGURE 1 to utilize the high pressure fluid provided by such assembly as a drive system is shown in FIGURE 5. According to the embodiment of this invention, the fluid 200 in the discharge manifold 40 passes sequentially through a piston type accumulator 201, a selector valve 202, hydraulic line as 203, hydraulic motors 204 and 205, and therefrom, via piping as 206, valve 202, return line 208, reservoir 207, to fluid suction inlet 34, valve 35, chamber 36, valve 39 and manifold 40.

The accumulator 201 is provided with a piston 211, lower piston stop 212, upper piston stop 213 and a filler valve 214. Below the lower stop are fluid inlet 215 and outlet 216. The piston 211 closely, yet slidably, fits in the cylindrical portion of the accumulator between stops 211 and 212 and, in the preferred embodiment, is made of aluminum to resist corrosion and hollowed so it floats on the top of the fluid. The outlet 216 connects by pressure input line 217 to the housing 220 of valve 202. Interior housing chambers 221, 222, and 223 provide for connection of passages 225 and 226 in selector valve body 224. Accordingly, the high pressure fluid passes, via line 217, to valve housing chamber 221, valve body passage 225, valve housing chamber 222, line 203, brake chamber 230, and hence, via lines 231 and 232 to motors 204 and 205, respectively. There the axles 233 and 234 of wheels 235 and 236 are turned.

The low pressure fluid then returns via line 237 to brake chamber 240, line 206, valve body passage 226, housing chamber 223 and return line 208 to reservoir 207. A pressure relief valve 241 is provided in bridge 242.

Valve body 224 is shown in the forward drive position: a 45° rotation of the valve body 224 in the counterclockwise direction, as by handle 243, from the position as shown in FIGURE 5, would reverse the direction of drive, and a 45° rotation of the valve body in the clockwise direction would bring the valve to the neutral position. This follows from that the center of passage 225 has one of its openings 90° along perimeter of valve body 224 from the center of its other opening and passage 226 is similarly formed, and the openings of the passage 226 are each 90° from the openings for passage 225. Further, line 206 enters both housing chambers 227 and 228, the centers of which are at 135° from each other, while chamber housing 222 extends clockwise for 45° and its counterclockwise edge is located 45° clockwise from the center of chamber 228 and said chamber extends to 45° counterclockwise from center of chamber 227, all directions as seen on FIGURE 5, and chamber 227 being a cylindrical passage with its longitudinal axis normal to the axis of rotation of the valve body, while chamber 223 extends clockwise 45° from a point clockwise 45° from the center of chamber 227, while chamber 221 extends 45° counterclockwise from the point 45° counterclockwise from the center of chamber 228, which chamber is a cylindrical one with its longitudinal axis normal to the axis of rotation of valve body 224.

The reservoir 207 has a piston 247 which closely, yet slidably, fits in the cylindrical portion of said reservoir below stop 248.

A filler valve 249 provides for preserving the air 250 above said piston and pressurizing it sufficiently to return piston 251 upwards against upper stop 254. In this embodiment, pistons, as 251 and 252, upper stops as 253 and 254, and lower stops as 255 and 256, are provided in chambers 26 and 36, respectively.

A J-shaped inlet line 257 is also provided in line 30. The pistons 247, 251, and 252, like piston 211, float on the liquid used therebelow and slidably fit in the cylindrical portion of the chamber in which located. A float 260 fits about filler pipe 261 in fuel chamber 32 and valve filler cap 262 provides pressure on the air 263 above the fuel supply. Thereby the entire pump system may be operated in inverted position. Also, the piston 251 permits use of this pump of FIGURES 1 through 12 with drilling fluids that are thermally not stable, such as those drilling muds using starch as the suspension agent.

The use of a supercharger 264 is generally the same as described below for FIGURE 13. Air enters the system at air intake 266 and is pressurized by the rotor 267 for passage through valve 27. Exhaust from line 86 actuates outlet rotor 270 for energization of rotor 267.

The speed of the motor drive is controlled by foot throttle control 271 on motor 46. Motor 46 is speeded up or slowed down, with variations in power output as above discussed. Foot brake 272 actuates piston 273 and piston 274 in brake chambers 230 and 240, respectively, to control the flow of fluid through the lines 203 and 206, respectively.

Fluid 200 in chamber 207, under pressure of air 250 in reservoir 207, returns to inlet line 34 and thence to cylinder chamber 36 to repeat the fluid movement above described between combustion cylinder 36 and valve 202, motors 204 and 205, and reservoir 207 in repetition of the cycle in sub-assemblies 21, 22, and 23 above described for the devices of FIGURES 1 through 12.

Another system utilizing a process of this invention for downwell pumping and, also, comprising modifications and adaptations of the pump assembly of FIGURES 1 through 12, its components and sub-assemblies, is shown in FIGURES 14 through 17. FIGURES 14 through 17 illustrate a downwell pump system adapted to provide high fluid pressures downwell to pump fluids from great depths, and to pump substantial volumes of fluids at high pressures from great depths with a minimum of moving parts in contact with such liquids as formation fluid 295 from underground zone 304.

The downwell pump system comprises an air compression assembly, 21, and a timing and valve assembly, as 23, constructed and interconnected as in the apparatus of FIGURES 1 through 12 and a downwell pump assembly 276. The downwell pump assembly 276 is located, at least in its sub-surface portion, in the outer casing 277. This downwell pump assembly 276 comprises a combustion chamber 278 connected at its top to the rotary injection valve 44 and, at its lower end, to the interior of a narrow combustion line 279. The interior of this narrow line 279 connects at its lower end with the enlarged interior of pump bell 280; this bell has a larger internal diameter than line 279 and is centrally located in the interior of pump chamber 282. Its lateral wall 283, top wall 284 and bottom wall 285 outline pump chamber 282. At its top the pump chamber interior connects with the interior of the pump chamber discharge line 286 through one-way valves as below described. Line 286 reaches to and over the surface 287, as shown in FIGS. 14, 15, 16, and 17. An annular passageway 294 with a cross sectional area transverse to its longitudinal axis equal to the similar cross sectional interior area of bell 280 is provided in chamber 282 peripheral to the outside of bell 280. One-way outlet valves 288 and 289 are provided in orifices therefor in top wall 284 of the pump chamber and one-way inlet valve 291 is located in the orifice therefor in the pump chamber bottom wall 285. The top wall of the pump chamber 282 is well below the static level 293 of the fluid 295 to be pumped. The casing, 277 is perforated, as at 296, to permit free flow of fluid 295 to the inlet valve. Combustion chamber 278 is provided with an ignition system as 43, and spark plug, as 37, as in the apparatus of FIGURES 1–12. The valves 288, 289, and 291 are each provided with hollow flotation chambers whereby such valves barely sink in the fluid in which to be immersed and, thereby, permit free flow of fluid therepast as shown in FIGURE 17 for valve 291 and FIGURE 15 for valves 288 and 289. It is also, within the scope of this invention that inlet valve control systems as 49 and outlet valve control systems, as 50 may be provided for each of the inlet and outlet valves in the embodiment of this invention shown in FIGURE 14.

The compressor assembly 21 used in the embodiment of this invention shown in FIGURE 14 is in the same position and phase as above described for the air compressor assembly shown in FIGURE 1, with air entering via the one-way inlet valve 27, and level of fluid 94 in chamber 26 falling while the one-way outlet valve 28 maintains the pressure in air supply tank 29 while the level of the fluid in the reservoir box rises. During this period—the length of which is determined by the rate of rotation of the valve body 52—the rotary exhaust valve 45 is open, as is the injection valve 44. In the phase shown in FIGURE 14, gas is being discharged from the interior of the pump cell 280. This gas volume 299 and inlet valve 291 are, in this period, urged upwardly by the difference in hydrostatic pressure resultant from the difference in the level of the static fluid level 293 and the level of the interface, 297, of said fluid, 295, and the gas, 299, in the bell. Accordingly, the level of the interface 297 approaches that of level 293; as the rate of flow through valve 291 falls to such a low value as to no longer keep such valve open, that inlet valve closes. The column of fluid 250 within the pump discharge line 286 is then supported on wall 284 and the heads of the closed valves 288 and 289.

The continued rotation of the exhaust valve 45 and rotary injection valve 44 to the position above described for FIGURE 2 results in a period during which a fuel air-charge enters the combustion chamber 278 and line 279 in the same manner and substantially under the same condition as such a charge enters the combustion chamber 36 of the embodiment shown in FIGURES 1 and 9. During this period the operations in the compressor assembly 21 and valve relations in the timing assembly 23 are as above described for the condition of the apparatus illustrated in FIGURE 2. The pump bell 280 and line 279 are filled with fluid 295 above the level of the outlet valves 288 and 290 substantially up to the static fluid level 293, i.e. to level 300 as shown in FIGURE 15.

Rotation of the rotary exhaust valve and the rotary injection valve by the driver therefor, as motor 46, to the orientation of such valves shown in FIGURE 3, followed by system 43 providing a spark across the gap of the spark plug as 37 ignites the fuel-air mixture in combustion chamber 278 and combustion tube 279 and forces the level of fluid down from level 300. Thereupon the outlet valve 291 is securely closed and, when the pressure developed by the combustion gases in bell 280 exceeds the pressure developed by the weight of the fluid in column 290 within line 286, the fluid interface level moves from 300 to 301 and fluid previously in bell 280 moves to passage 294 and upwardly towards valves 288 and 289, displacing upwardly the fluid in column 290, which fluid is then discharged from the outlet of the discharge line 286 as shown in FIGURE 15. The volume of fluid thus discharged is the volume of fluid displaced from the bell by the increase of volume of the fuel-air mixture on ignition, as from level 300 to level 301. As the fuel-air mixture used in this apparatus is injected at 200 p.s.i.g. into the volume provided for combustion, an ignition temperature of about 4,000° F. results, as in the embodiment of FIGURES 1–4. As the internal volume of the line 279 and the bell 280 from bottom of valve 44 down to level 301 is the same as the volume down from bottom of valve 44 to the gas liquid interface 107 in FIGURE 4, the same discharge pressure is developed in the apparatus of FIGURE 14 as in the apparatus of FIGURES 1–12.

Following this discharge of fluid, the valves 288 and 289 again sit in their seats 288′ and 289′ respectively and, as above described, support the column of fluid 290 thereabove up to the discharge level 302 of the discharge line 286. A floating piston, as 303, may be used in the chamber 280 with a stop, as 305, to positively limit the volume of the fluid discharged.

The further continued rotation of valves 44 and 45 as above described for FIGURE 4 provides an interval and apparatus connection for the passage of the gases in chamber 280—at a pressure equal to that required to open the valves 288 and 289 against the weight of fluid pressure developed at the bottom of fluid column 290—through line 279 and valve 44 through a line as 30 in assembly 21 to compress the gas in the air compressor chamber 26 as above described for the embodiment of apparatus shown in FIGURES 1–4 and thereby charge vessel 29 in the embodiment of FIGURE 14 with such compressed air for subsequent use in the system of FIGURE 14. During this interval, as shown in FIGURE 17, the inlet valve 291, closed at the beginning of such interval, begins to move upward under the influence of the difference in pressure across the head of that valve due to the above described fall in pressure within chamber 280. Accordingly, fluid enters the bell 282 and raises the level of the interface from 301 in FIGURE 15 towards level 297 in FIGURE 14.

Thereafter, on further rotation of the exhaust valve to its open position as shown in FIGURES 5, 10, and 11, gases from the fluid reservoir box 25 and chamber 282 pass through the rotary exhaust valve to the air, or, preferably to a supercharger as 264, arranged and connected as in FIGURES 5 and 13. The valve 291 accordingly opens, fluid 295 enters, and level of fluid in the bell 280 thereby rises; the fall in pressure over the fluid in the fluid reservoir box reduces the pressure over fluid 94 in air compressor cylinder 26, the level of that fluid 94 drops, inlet valve 27 opens, as above described for the situation in the embodiment shown in FIGURE 5, and the cycle above described for FIGURE 14 begins again.

It will thus be seen that, according to this embodiment of this invention there is provided a pump system for providing large pressures sufficient to positively drive fluids from great depths at high pressures by apparatus requiring little maintenance because of few moving and few wearing parts and few parts contacting abrasive liquids; the entire pump is readily movable in and out of the well casing and requires no downwell electrical connections. The above described pump action is further accomplished at high thermal efficiency by the simple and sturdy apparatus above described.

The operation of the apparatus of FIGURES 14–17 is improved by adding a sleeve 703 over the pipe 300. The sleeve 700 extends down to the top of bell 280. A landing head subassembly 701 is provided in the neighborhood of the junction of sleeve 703 and the top of bell 280. The landing head 701 subassembly comprises a floating valve 705 (comprising a valve head 707 and a valve sleeve 709), movable in a valve cage 706 a scavenging head 711 (which joins the bottom of tube 300 and sleeve 703 and top of bell 280) scavenging valve 5 rods 713 and 715, lower annular valve ring 717, upper annular valve ring 719, valve ring spring 721, upper valve plate 724 with a plurality of orifices 725, 726 therein and lower pipe orifices 727, 728.

The shield 703 is spaced away from the pipe 300 by an annular space 723 which connects to chamber 29 by a valve 731 whereby to pass compressed air into line 300 from tank 29 into line 300 by orifices 727 and 728 when the valve rings 719 and 717 are in their non-sealing position.

The upper sealing surface 720 of the annular ring 719 is normally held resiliently over orifices 725 and 726 by springs 721 as shown in FIGURE 42, and seals those orifices.

The bell-shaped valve 705 is composed of an imperforate cylindrical hollow sleeve firmly joined to an imperforate conical head 707 by an annular valve rod stop 708 in the bottom plate 710 of which the rods as 713 and 715 are supported in the position shown in FIGURES 40 and 43. The top of valve head 707 smoothly fits the bottom of scavenging head 711.

The valve 705 moves freely up on down in the hollow cylindrical sleeve 706. The sleeve 706 is firmly attached at its top to the bottom of the scavenging head 711. The wall of valve sleeve 706 has a plurality of spaced apart orifices 733, 734 at its top and an internal collar 736 at its bottom that serves to support the valve 705 in its lowered position (FIGURE 42).

The rods 713 and 715 (and two other similar rods not shown) are rigid solid cylindrical bars that pass through spaced apart rod holes therefor as 738, 739 in the landing head with a smooth sliding fit. A shoulder as 741 on rod 715 on each such rod as 713 and 715 is freely movable up and down within a landing head rod chamber 743. The shoulder therefor supports each such rod in its towered position as shown in FIGURES 41 and 42 and limits the upward travel of the rod as shown in FIGURE 40. The bottom of valve ring 717, in its lower position (FIGURE 41) closes over the orifices as for each upper landing head rod hole as 738 for each rod.

The upper valve plate 724 is a firm rigid plate flat on its bottom that is firmly attached with a gas tight seal to the inside of the cylindrical sleeve 703 and the outside of cylindrical line 300. The upper ring 719 is arranged to smoothly move over line 300 and to form, in its raised position a firm gas tight seal with plate 724 and completely seal orifices therein as 725 and 726.

Spring 721 and the distance between the top of head 711 and bottom of plate 724 and the location of holes 727 and 728 and length of rod 713 and 715 provide that the rods lift the ring 719 over the holes 727 and 728 and that the usual pressure of air or gas in space 723 will move ring 719 from plate 724 as needed for operations below described during position of parts shown in FIGURE 40 but otherwise keep that valve closed.

Ring 717 also has a smooth sliding fit over line 300; its upper lip 745 closes over orifices as 727 and 728 in line 300 in the lower position of the ring.

In operation of the apparatus of FIGURES 14 and 40 the rising fluid 295 and gas 299 supports the bell 705 in cage 706 and forms a firm gas tight seal between the conical top 709 of valve 705 and the bottom of head 711 and seals the bottom orifice 747 of line 300. Step plate 710 urges rods 713 and 715 to raise valve ring 717 over holes 727 and 728; valve 731, connected to tank 29 (driven by motor 46) and synchronized with the valve subassembly 23 passes air down through space 723 and the pressure thereof moves valve ring 719 downwards whereupon that air from space 723 passes upwards of line 723 and aids in scavenging the gas previously discharged up line 300 from the interior of the bell 280.

As movement of the valves as 45 and 44 (or their equivalent) and cessation of discharge of exhaust gases valve ring 719 is closed as in FIGURE 41 and, on combustion of the combustible gas placed in line 300 and expansion thereof as shown in FIGURES 2, 15 and 41 the liquid in bell 280 and valve 705 are driven down by the gas passing from line 300 through orifices 747 and then 733 and 734, drives down the liquid 295 initially as shown in FIG. 41 then to stage shown in FIG. 42.

On continued rotation of the valves 44 and cessation of discharge of liquid as shown occurring in FIG. 15 and reaching stage shown in FIG. 16 the valve 705 previously left resting on collar 736 is then, by return upwards of liquid 295 in bell 280 again raised upwards of cage 706 as shown in FIGS. 17 and 43 and begins to open the orifices 727 and 728 by bouyancy of valve 705. On opening of the exhaust openings by the valve as 45, the combustion gases in line 300 are scavenged as above described, when shoulder 710 meets rods 713 and 715.

The use of the sleeve 703 provides not only an improved scavenging but also a heat shield for line 300 so that the gas produced by combustion in line 300 reaches the interior of bell 280 at 900° F. while, without the use of sleeve 703 gas exploded in line 300 reaches the interior of bell 280 at about 65° F. Accordingly, the sleeve and landing head provides a great increase in mechanical efficiency of the entire pumping operation using the apparatus of FIGS. 14–17.

In a preferred embodiment the valve 705 is 68 inches long from top to bottom, has a 2.495" I.D. and 2.625 O.D., collar 736 is 1⅛" high and cage 706 is 72½" long from its connection to head 711 to its bottom and holes 733 and 734 therein are 2¼ inches diameter.

In the embodiment of apparatus shown in FIGS. 23–26 line 431 may have a sleeve 750 surrounding it and insulating it in the same manner as sleeve 703 surrounds and insulates line 300. A landing head 751 corresponding to head 711 in structure and function as provided at the top of bell 430 and a valve cage 752 is attached thereto in the same manner and operates in same manner that cage 706 is attached to head 711.

Additionally, line 419 is provided with a sleeve 754, landing head 755 and valve cage 756 corresponding in structure and function to sleeve 703, head 711 and cage 706 respectively as above described.

The tank 29 is connected to the interior of sleeve 750 or 754 by a valve 758 which valve operates as does valve 731 in similar synchronization with the valve system, as 54 (and 421).

Cages 752 and 756 have valves therein corresponding to valve 705. Sleeves 750 and 754 and their associated landing heads and other apparatus improves the action of the apparatus of FIGURES 23–26 in the same manner as such apparatus helps the function of the apparatus of FIGURES 14–17 above described.

Another apparatus and system within the scope of this invention is shown in FIGURES 18 and 19. This apparatus comprises an air compressor assembly 21, a timing and valve assembly 23 in combination with a modified pump assembly 22 of FIGURE 1—generally as in the arrangement of the apparatus of FIGURES 14 to 17. This apparatus is essentially a modification of FIGURES 14 to 17 and comprises the air compressor 21, and the timing and valve assembly 23 as in FIGURES 1–12 and 14 and a pump assembly 309. The pump assembly of this apparatus comprises an outer discharge tubing 310 within which the components of this assembly are positioned. The tubing 310 is located within a conventional well casing as 276' with perforations at 296': the static fluid level shown in FIGURES 18 and 19 would be at 293' and numbers indicated by prime (') indicate structures denominated by similar numbers in the apparatus of FIGURE 14. This apparatus and system is directed to pumping operations in extremely deep zones, such as 10 to 20 thousand feet.

The pump assembly 309 comprises a combination chamber 311 operatively connected at its top with the valve 44 of assembly 23 and, its bottom, opening into a combustion tube 312. The combustion tube connects at its lower end with the top of elongated cylindrical pump bell 313. A differential piston 315 having a plunger 316 attached to the bottom thereof, is slidably located in said pump bell. The pump bell is open at its bottom end 317.

The pump bell 313 is located within elongated cylindrical pump bell housing 320 which is concentric with bell 313. The bell housing 320 is open at its top to the interior of the discharge tubing 310. The discharge tubing extends external to and concentric with combustion tube 312 to the surface 287' and there forms a discharge nozzle 322. The bottom of the bell housing operatively connects to the interior of the pump barrel 325, an elongated cylindrical tube coaxial with the pump bell 313 and the housing 320: pump barrel extends downward and is open at its bottom end 326. The walls of pump barrel 325 are especially strong to withstand the pressures applied thereto. Valve partition 327 is located between the bottom of housing 320 and the top of the pump barrel 325. This partition is provided with a plurality of one-way discharge valves as 328 and 329: valve seats 328' and 329' respectively are provided for each such valve in the partition. The open bottom 317, of the bell 313 is slightly but definitely spaced above the partition 327. The differential piston 325 slidably reciprocates along the length of the bell 313, between upper stops 330 and 330' and lower stops 331 and 331'. The plunger 316 is a cylindrical rod which passes from the bottom of the piston 325 through plate 327 with a close sliding fit when said piston is adjacent the upper stop 330. A suction valve plate 333 is provided near the bottom of pump barrel 325 at a distance from plate 327 greater than the length of the plunger 326. One-way suction valve 334 is located in a seat 334' therefor in said plate 333. The bell 313, and the partition 327, are located substantially below the static fluid level 293' of the liquid to be pumped: in the preferred embodiment such inlet 326 would be in the zone of the perforations 296' in the casing 276'.

In the preferred embodiment shown in FIGURES 18 and 19 there is also provided a floating piston 335 in the combustion tube 312. This floating piston slidably fits into that tube and has a density only slightly less than the fluid therebelow. The column of liquid 336 located between pistons 325 and 335 provides for the transmission of pressure between those two pistons. In the extreme deep zone pumping use of this apparatus the ability to effect such efficient transmission of pressure as is provided by that fluid column 336, is extremely desirable.

The operation of this apparatus parallels several of the operations of the device illustrated in FIGURES 14 to 17. The position of the components of the air-compressor and valve and timing assembly of this apparatus during the power stroke (FIG. 18) parallel those of the air compressor assembly 21 and the timing and valve assembly 23 of the apparatus of FIGURE 15 and FIGURE 3 above discussed whereby is provided that, on the ignition of the fuel-air mixture in the combustion chamber 311 and combustion tube 312, the floating piston 335 is driven downwards: the column of liquid 336 transfers the pressure thus developed to the differential piston 315 and drives plunger 316 into pump barrel chamber 337. The injection of the additional volume of that plunger into that chamber forces liquid in such chamber out through the one-way valves 328 and 329 when the pressure in the chamber 337 exceeds that provided on top of plate 327 from the column of liquid 339 in the bell housing 320. This movement of fluid from chamber 337 in turn displaces fluid, as 341, in the discharge tubing 310 upward and out of its discharge opening 322. The direct transmission of pressure between the extremely deep zone 305 from which pumping of fluid 342 is provided by this embodiment of this invention and the floating piston 335 avoids any time delays required for the return of combustion gases and inherent friction losses that might be required in an apparatus as in the embodiment of FIGURES 14 through 17.

Following discharge of fluid from chambers 337 and outlet 322 the valves 44 and 45 move to the open position as above described for FIGURES 1, 4, and 5. Thereupon, as shown in FIGURE 19, the fall in pressure in the combustion tube above piston 336 and the pressure differential of fluid in the discharge tubing 310 exerted against the lower face of piston 315 returns piston 315 upward against the upper stops as 330 and 330' while valves 328 and 329 close. Concurrent withdrawal of plunger 316 out of chamber 337 reduces the pressure on top of suction valve 334 below that pressure exerted therebelow by the fluid 342 which has the static fluid level 293', thus opening valve 334 and permitting the formation fluid 342 to flow into chamber 337. Thereafter, injection of the fuel-air mixture into combustion chamber 311 and combustion tube 312 is accomplished by the procedures above described for the apparatus as shown in FIGURE 2. Since the injection pressure is below that pressure exerted by the fluid in discharge tubing 310 the piston 335 will not be forced downward until ignition of that fuel-air mixture occurs. Ignition of the fuel-air mixture in the combustion chamber 311 and combustion tube 312 drives the floating piston 335 and the differential piston 315 down again as above described for FIGURE 18.

Thus the high pressures provided by the process of FIGURES 1–12 above described are utilized by the deep zone pump apparatus of FIGURES 18 and 19 to provide extremely high pressures downwell, in chamber 337, whereby to drive fluid therefrom at the extremely high pressures met in extremely deep zones, such as 12 to 20 thousand feet, at rates which may be controlled and/or fixed by controlling and/or fixing the r.p.m. of the valve body 52 and the size of the pump plunger 316.

A device for velocity perforating and fracturing according to this invention is shown in FIGURES 20 and 21. It comprises an air compressor assembly 21 and a timing and valve assembly 23 as in FIGURE 1 connected as in FIGURE 14 together with, in the casing 344, a fracturing assembly 343 to treat a formation as 370 as shown in FIGURE 20.

The fracturing assembly according to this invention comprises an elongated cylindrical outer shell 346' which is, in turn, composed of a transmission section 347, a bell housing 348 and an extreme pressure pump barrell 349 and a side wall jet discharge section 350. Within said shell 346' is a combustion tube 351 connected operatively at its upper end to a combustion chamber 352 and, its lower end, to a pump bell 353. A differential piston 345 is slidably located within the pump bell in the same manner as piston 315 is located in pump bell 313. The piston 345 has attached thereto a plunger 346 as does piston 315, and the piston 345 moves upward and downward between its upper piston stop 358 and the lower piston stop 359. The pump bell 353 is an elongated hollow cylinder concentric with the longitudinal axis of the housing 348. The housing 348 is provided with a valve and partition plate 361 between the chamber 362 of the extreme pressure pump barrel 349 and the interior chamber, 363, in the pump bell housing 348. A plurality of one-way valves, as 365 and 366, are located in seats therefor, as 365' and 366', respectively, therefor in the plate 361. The bottom of the pump bell is spaced away from the plate 361 sufficiently to allow fluid to pass from the interior of the pump bell 353 to the outside thereof and into the peripheral chamber 363 and to return freely therefrom. The pump plunger 346 is sufficiently long to reach from the bottom of the piston through the valve plate 361 when the piston 345 is adjacent to the upper piston stop 358. The length of the extreme pressure pump barrel is such that the pump plunger 346 reaches almost but not quite to the bottom of the chamber 362 when the differential piston is adjacent the bottom stop 359 in the pump bell 353.

The barrel 349 is built extremely sturdily to withstand the pressures applied thereto.

The extreme pressure pump barrel 349 has at its bottom a pair of diametrically opposed side-wall jets 350 and 350′ and, above said jets, a one-way discharge ball valve 367 (ball 368 is resiliently fixed in position, as by spring 369, therefor) to provide for passage of fluid from chamber 362 in barrel 349 at extremely great pressures through said jets 350 and 350′ to fracture the formation such as 370 where such jets contact it at points 371 and 372. Pressures of 800 p.s.i. to 2000 p.s.i. are provided to this sub-assembly at the floating piston 373 located in the combustion tube 351; as pressures are transmitted to a piston, as 345, of substantially larger area and result in a great multiplication (in proportion to the relative cross sectional areas of piston 345 and plunger and plunger 346 of the force applied by the plunger, 346, and, accordingly, a 10 to 100 fold increase in pressure at the points 370 and 371, and even greater, as the diameter of the plunger 346 is reduced.

Accordingly, fluid forced outward of the chamber 362, on each 180° rotation of the rotary injection valve body 52 is driven into the formation 370. The following increment of fluid volume forced out of the chamber 362 drives the previously ejected fluid even deeper into the formation, as shown by the areas 375 and 376, 375 being the fluid ejected into the formation on a first half cycle of the valve 52; on the second half cycle of the fluid previously at position 376 is moved deeper into the formation, i.e., to the zone 375. Additionally, other fractures are made such as 377 in brittle formations due to the extreme pressures developed by this tool.

The movement of piston 345 shown in FIGURE 20 is effected by combustion of the fuel-air mixture in chamber 352 provided there in the same manner as provided for combustion chamber 311 and 278 above described. Following ignition of the fuel-air mixture in the combustion chamber 352 and combustion tube 351 the rotary injection valve 45 moves to the position shown in FIGURES 4 and 5 above discussed. Thereupon, the reduction in pressure above the floating piston 373 results, as shown in FIGURE 21, that the injection fluid within the section 347 would pass through the peripheral housing chamber 363 and upward inside bell 353 against the piston 345 to move said piston upward toward and against the upper piston stop 358. This movement reduces the pressure in chamber 362 sufficiently to open valves 365 and 366. Fluid from chamber 363 then enters chamber 362 and replenishes the volume previously discharged from chamber 362 into the formation 370.

Injection fluid and propping agent 340 enters shell 346′ for transmission to chamber 362, pressurization in that chamber and discharge therefrom into the to-be-fractured formation as above described.

Accordingly, chamber 362 would then be full with fluid and set for discharge of fluid through the valve 367 as above described on ignition of the fuel-air mixture in combustion chamber 352 and combustion tube 351 and repetition of the action above described for the device of FIGURE 20, and again drive high pressure fluid into formation 370.

The volume of fracturing fluid pumped into the formation is dependent on the rate of rotation of the valve body 52 in the timing and valve assembly 23 above described in some detail. In this system air compressor sub-assembly 21 and timing and valve sub-assembly 23, as above described, actuate the particular perforating and fracturing assembly hereinabove described. The above mentioned apparatus is freely movable up and down in the well and out of the well hole 344. The injection fluid may of course also have propping agent therein as shown in conventional procedures, such as U.S. Patents Numbers 2,699,212 and 2,337,295.

According to another embodiment of this invention shown in FIGURE 22 the combustion tube 381 is rotatably mounted on swivel bail 382, the outer shell 346′ is dispensed with, and the well casing 344 is used to transmit the injection fluid and pumping agent down to where fracturing as 375′, 376′ occurs as in the device of FIGURES 20 and 21. This apparatus differs from that shown in FIGURE 20 by the use of packers 385 whereby the device injection fluid and propping agent 387 are directed from the annular channel 388 into pump bell housing 386, thus allowing this apparatus to be raised, lowered and rotated as desired. The device of FIGURE 22 dispenses with one set of tubing which is an economic benefit.

In this device the combustion tube 381 is provided with a floating piston 384 which connects with the pump bell 383 as above described for the device of FIGURE 20. Within bell 383 are a piston, 345′, with a pump plunger 346′ attached thereto, and stops as 358′ and 359′ all corresponding to similarly numbered components in the apparatus of FIGURE 20. The pump bell housing 386 in this case connects directly to the well casing 344 by the packer 385 whereby to transmit the injection fluid and propping agent 387 via the annular channel 388 about the combustion tube 381 into pump barrel 349′. Swivel bearing 391 allows the combustion tube 381 to rotate and accordingly rotate the extreme pressure pump barrel 349′ to any position desired about the vertical axis. A mounting flange 389 supports the valve 44 on top of the swivel housing 390 and combustion tube 381 is also supported from such housing on swivel bearings 391. Otherwise, the structure and operation are the same as above described for FIGURES 20 and 21.

Yet another apparatus according to this invention, illustrated in FIGURES 23 through 26, provides a selective zone deep well pump whereby a plurality of producing zones may be selectively pumped. This apparatus comprises an air compression sub-assembly, 21, and a timing and valve sub-assembly, 23, as in FIGURE 1 and a selective deep well pump assembly 400 in combination as shown in FIGURE 23. Generally the selective zone deep well pump 400 comprises a deep well pump 401 as above described in relation to FIGURES 14 through 17, in combination with a modified deep well pump 402 thereabove operatively connected to each other through a transfer tube mechanism 403. The pump assembly 401 would be located in a lower producing zone 405 while the upper modified pump assembly 402 would be located in the upper producing zone 406. Zones 405 and 406 would be separated from each other by an impervious zone 407. A single casing 409 would provide for contacting both producing zones by perforations therein as 410 and 411 for zones 405 and 406 respectively. A packer 412 separates the upper and lower portions of the well casing and is located between the two producing zones.

The lower or deep pump assembly 401 comprises a pump housing 413 corresponding to the housing 282 of FIGURE 14, a pump bell 415 corresponding to the bell 280, a suction valve 416 corresponding to the suction valve 291 and discharge valves 417 and 418 corresponding to the valves 288 and 289 in structure and function as above described. The combustion tube 419 for pump 401 corresponds to the combustion tube 279 above described of the device of FIGURE 14 in structure and in function. Tube 419 is connected to its fuel-air mixture supply, through passage 420 of dual completion valve 421, to the valve body 52 of valve 44 and to the spark plug 37; the discharge tube 422 of pump housing 413 passes upwardly exterior and concentric to the deep zone combustion tube 419 until it has reached the level of the packer 412. Thereupon it feeds by a one-way transfer valve 414 into a pump housing of the shallow zone pump 402. The shallow zone pump assembly 402 comprises a housing 425 which connects by a discharge tube 427 through a discharge outlet 429 above the surface 428. The shallow zone pump is provided with a bell 430. This bell is connected to the valve body 52 of the timing and valve assembly 23 by its combustion tube 431 through a shallow zone combustion valve 432. The bell 430 is a vertically elongated cylinder whose axis is concentric with the longitudinal axis of the deep zone combustion tube 419 as well as its own combustion tube 431 and the axis of the housing 425. The housing 425 is provided near its top with a discharge valve partition 434 in which are located one-way discharge valves 435 and 436. Below the open bottom of the bell 430 are located one-way inlet valves 437 and one-way transfer valve 414 in a valve partition 439 at bottom of housing 425. Fluids from the producing zone 406 pass through perforations 411 in the casing 409 to the perforations 438 in that portion of the housing 425 which projects below partition 439. These fluids reach the interior of the bell 430 as below described. The deep zone discharge line, 422, feeds into transfer valve 414 of the shallow zone pump assembly 402. Transfer valve 414 is opened when deep zone pump 401 is discharging by flow of fluid from the pump bell 415 as shown in FIGURE 23 and for reasons discussed in relation to FIGURE 15. Movement of the exhaust valve 44 and the rotary injection valve 45 of the timing and valve assembly 23 of the combination with the selective zone deep well pump 400 as above described for FIGURES 4, 5, 16 and 17 provides that the combustion gases formed during the ignition (illustrated in FIGURES 3 and 15 and 23) may escape. The pressure above the liquid gas interface as 440 in pump bell (443 in FIGURE 24) then falls and the pressure of the formation fluid 445 in the producing zone 405 causes such fluid to flow through perforations as 410 into the suction valve 416 and force it upward. The formation fluid then enters the interior of the pump bell 415 and thereby raise the level of said interface 440. This prepares for the repetition of the cycle above described for the device of FIGURE 23, whereby the fluid within the pump bell 415 is again driven outwardly thereof to the chamber between the pump housing 413 and said pump bell, displaces the fluid there, forces it upward out through the discharge valve 417; the fluid thus displaced through discharge valve 417 displaces the fluid in the discharge line 422 and discharges it through the transfer valve 414 displacing the fluid therein through the discharge valves 436 and 435 upwardly and outwardly through the discharge tube 427 and through the outlet 429. The cycle of operation in compressor assembly 21 and timing and valve assembly 23 in this combination is the same as above described for FIGURES 1 through 5 and 14 through 17.

When dual completion valve 421 is turned to close passage 420 and open shallow zone passage 432 therein, transfer valve 414 is kept shut and the operation of the pump of shallow zone assembly 402 generally parallels that shown in FIGURE 14, i.e. the combustion tube 431 for the shallow zone pump 402 provides—by cooperation with the air compressor assembly 21 and the timing and valve assembly of FIGURES 1 through 12—for displacement of the fluid in the bell 430 and discharge thereof between the bell 430 and the bell housing 425: thereby such fluid passes upwardly through valves 435 and 436, through the discharge tubing 427, and out through the outlet 429 as shown in FIGURE 25. This discharge occurs on ignition of the fuel-air mixture provided to the combustion tube 431 in the same manner as provided to the combustion tube 279 of FIGURE 15. Then the above-described rotation of valves 44 and 45 of assembly 23 of this selective zone deep well pump follows the expansion of the ignited fuel-air mixture to form combustion gases: the opening of such valves, as in FIGURE 26, releases combustion gases from the pump bell chamber and charges the air compressor system 21 as above described for such assembly 21 in FIGURE 4 as well as FIGURE 16. The pressure above the gas-liquid interface 441 in the shallow zone pump bell 430 falls and formation fluid 444 from the zone 406 passes through the perforations 411 in the casing 409 to drive the level of fluid upward by passing through the tubing perforations 438 in the housing 425 and lifting the suction valve 437 whereby the shallow zone pump system 402 is again in the same position and its component parts in the same orientation as above described for the assembly shown in FIGURE 24 (and similar to FIGURE 14). Thereupon, the air compression system 21 and the timing and valve assembly 23 of the selective deep well pump combination shown in FIGURE 23 again cooperate to again provide a fuel-air mixture to the combustion chamber and combustion tube for the shallow zone pump system 402. Ignition of this fuel-air mixture causes expansion of those gases and a repetition of the operation above described for FIGURE 25.

It is thus seen that, according to this combination of components of this invention including those of the pump above described in FIGURES 1–12, there is provided a selective zone deep well pump which permits pumping formation fluid at high efficiencies with a minimum of wear to the operating parts and providing high pressures down well and provides for selectively pumping any of a plurality of producing zones. This is especially adapted to a dual completion well (as an example of a multi-zone pumping operation) as above described in relation to FIGURES 23 through 26.

The dual completion valve 421 shown generally in FIGURES 23 through 26 and in more detail in FIGURE 29 comprises a housing 446 with a valve body chamber therein of truncated conical interior shape wherein valve rotor 447—which is of corresponding truncated conical exterior shape—rotatably yet firmly fits. The rotor is provided with deep zone passage 420 and shallow zone passage 432. Deep zone passage 420 is generaly parallel to the longitudinal axis of the rotor and connects neck 63 of the valve 44 in this combination—through corresponding passages in the housing 446—with deep zone combustion tube 419. Shallow zone passage 432 is at a slight angle to the axis of the valve rotor body and connects—through corresponding passages in the housing 446—to neck 63 of the valve 44 of this assembly and the shallow zone combustion tube 431. In the preferred embodiment the rotor has a 12 inch overall length and a 6 inch maximum diameter. Drive shaft 448 for rotor 446 is located with its axis on the longitudinal axis of the rotor for rotation thereof as desired to connect or disconnect either of passages 420 or 432. The position of passages 420 and 432 in the disposition of components shown in FIGURES 23 and 24 are shown in solid lines in FIGURE 29; the position of the same passages in the arrangement shown in FIGURES 25 and 26 are indicated as 420′ and 432′ and shown in dotted lines in FIGURE 29. Rotor 447 is, in the preferred embodiment, made of hardenable stainless steel, as type 440C, hardened and finely machined to ±.0001 inch after preliminary machining and grinding work thereon has been done, as with the valve bodies for valves 44 and 45, as above described. Lubrication is effected with, for instance, high temperature resistant lubricant.

According to this invention, the lower liquid producing zone may be pumped searately for a series of strokes as above described followed by pumping of the upper zone. Also within the scope of this invention is the sequence of operation to pump a first liquid producing zone as 406 for one cycle of operation as above described, then to pump another liquid producing zone (as 405), then similarly to pump the first zone again, then the second, etc., thereby relatively steadily pumping a plurality of zones over a given period of time. The valve rotor may be made with a right cylindrical exterior outline in a pump valve housing chamber of corresponding interior shape and the valve housing and rotor provided with a coolant inlet and outlet as for the valve housing and rotor in valves 44 and 45 above.

Anti-gas lock valve 468 is important when pumping where inherent gas pressure buildup exists as below packer 412. It opens due to pressure differential, e.g. if gas is present (FIGS. 14 and 24) but is closed by light spring and pressure differential.

Another device especially adapted to be used with the embodiment of the invention as shown in FIGURE 13 is a ram jet compressor assembly shown in FIGURE 27 and FIGURE 28. FIGURE 27 is an overall view including the kelly assembly 450 and the supporting swivel 451 of the ram jet compressor 452. The ram jet assembly is supported on swivel bail 453. A gooseneck air supply line 455 enters a rotatable swivel 451 supported on bail 453. A high tension line 456 enters the gooseneck through a gland nut 457 provided therein for the fuel line 459. A probe gland 460 for the spark probe 461 is provided within the fuel line 459 as shown in FIGURE 28. A fuel regulator 462 is provided in fuel line 459 and is controlled by a temperature and pressure sensitive controller 463: this controller is actuated by a bleeder line extending thereto from the line 455. The air channel 464 within the air line 455 extends through the vertically elongated swivel sub 465 with probe 461 enclosed therein down through the pressure bell 466 and into the combustion chamber 467 located in the center of the vertically elongated hollow ram jet barrel 469. An open gas passage extends downward from the combustion chamber 467 through the kelly combustion tube 470 but separated from the interior wall of said tube by an annular space 471, to the discharge nozzle 472.

FIGURE 28 shows the ram jet barrel and the region of the probe gland 460 in some detail. Barrel 469 is an elongated hollow cylinder. An annular ram jet thrust head, 484, with a central orifice, described in detail below, divides the central hollow space within said barrel 469 into an upper bulbous pressure bell 466 and a lower combustion chamber 467.

The pressure bell 466 has a circular cross section generated symmetrically about a central vertical axis through which the spark probe 461 passes. The probe has, in the preferred embodiment, a stainless steel, type 310, cylindrical shield 476 concentric with and enclosing high temperature line 456. Ceramic insulation 477 fills the space between the said shield and said line 456. A ground electrode 479 is attached to the hollow cylindrical metallic fuel tube 480, which tube is concentric with the shield 476 extends from the fuel line 459 and is supported by the gland nut 457. The channel in fuel tube 480 provides an annular passage 481 for the passage of fuel from the line 459 through gland 457 to the combustion zone 467. The tube 480 is perforated, as at 482 and 482', to provide a downwardly directed spray, 483, of fuel at the level of the electrode 479. The bottom end of the tube 480 is expanded as shown in FIGURE 28.

The ram jet thrust head 484 contains a plurality of concentrically arranged upwardly open cool air intakes 485 and 486 therein. The ram jet thrust head also supports therebelow three concentric tubes, central combustion tube 497, primary combustion tube 498, and secondary combustion tube 499. The ports, as 485, and 486, each provide for passage of cooling air through the spaces peripheral to each of these three concentric cool air tubes i.e. primary cooling air parallel and immediately peripheral to the central combustion tube 497, secondary cooling air parallel and immediately peripheral to the primary cool air tube 498, and tertiary cooling air parallel and immediately peripheral to the secondary cool air tube 499. Central combustion tube 497 is provided with a plurality of downwardly and inwardly directed perforations as 501 and 501' for passage of primary cooling air from between tubes 497 and 498, for reasons below described. The ram jet barrel 469 is tapered conically at 502 below the fuel combustion zone 467 to drive the secondary and tertiary cooling air through the perforations as 503, also downwardly and inwardly directed through the tube 497.

Ram jet thrust head 484 has a centrally projecting portion 487 which, with fuel tube 480, defines the ram jet air intake orifice 489. The bulbous portion of the probe 461 is below the narrowest portion of such orifice and is also below the vena contractor of the gas flow passing through that orifice in the normal operation of this apparatus.

In a preferred embodiment of this invention the overall length of the assembly of FIGURE 28 would be 10 feet overall from the top of barrel 469 to bottom discharge 472 with a overall diameter of 8 inches and weigh appoximately 1,000 pounds. Such an apparatus would take in some 1800 cubic feet per minute of free air at 60° F.; the discharge thereof would be at 500° F. this would consume about one hundred pounds of propane per hour and provide about 250 horsepower output on a B.t.u. per minute input of approximately 33,200 B.t.u. In operation combustible fuel enters through line 459 and is passed via fuel line 480 to the combustion chamber 467. A conventional spark system as a conventional vibratory ignition pack provided with a conventional ON-OFF switch, operating across the electrode 479 to the hot spark wire 456 provides—with air entering through line 455—a substantially continuous flame 483 in the combustion zone 467. The combustion air which enters the combustion chamber through the ram jet orifice 489 is super heated by the combustion process to some 2,000° F. Only about one quarter of the total amount of the air fed through line 455 is so heated; about ¾ of the total volume of air passing through line 455 passes through the cooling ports as 485 and 486. Such cooling air is distributed by the cool air passages in ram jet head 484 to the three spaces between the three concentric cool air tubes and the wall 469 of the ram jet barrel. Boundary layer cooling air from the primary cooling air channel between tubes 497 and 498 flows through the ports as 501, 501' along the interior surface of the central combustion tube 497 and thus prevent the combustion chamber 467 from over heating. This primary cooling air also insulates the secondary cooling air between tubes 498 and 499 and tertiary cooling air between tubes 499 and the interior surface of the barrel 469 throughout the length of the ram jet barrel.

The secondary and tertiary cooling air are mixed at the end of the combustion chamber at zone 502 and then are used to insulate the "kelly" wall throughout its entire length and to furnish boundary layer cooling air to the "kelly" combustion tube, 470, by passage of a portion of said air through the orifices 503, 503' in the "kelly" combustion tube. This boundary layer of cooling air thus protects that combustion tube from the high temperatures of the gases passing therethrough and thereby maintains the temperature of the "kelly" below 180° F. The combustion tube discharge nozzle 472 directs the central super heated air stream and the boundary layers down the center of the drill stem in their same relative positions thereby retarding the complete mixing of the two air streams and thus lowering the operating temperature of the metal of the first drill stem.

In starting, an air compressor as the system of FIGURE 13 forces compressed air through the drill string. The ignition system is then turned on. Fuel is then metered through the fuel spray nozzles 482 and 482' at the proper rate as determined by the measurement of air pressure and temperature in the conventional control apparatus 463.

In stopping, the fuel regulator system is turned off first and fuel pressure manually and gradually reduced to decrease the combustion chamber temperature to the normal safe shut-down level; then the fuel shut-off valve is closed. Thereafter the ignition system is turned off.

Reed valves 505 as shown in FIGURE 30 are used in

29 the preferred embodiments of the compressor sub-assembly 21 of the assemblies hereinabove disclosed. Such reed valve is used in line between the compressor valve outlet to valve 28 and chamber 29 in the embodiment of FIGURES 1 through 11 in place of the check valve generally shown as 28 and positioned in dotted lines in FIGURE 4 and as shown in dotted line at 505' in line 151 of the embodiment of FIGURE 13 in place of valve 150 or in place of valve 172' of FIGURE 13. Such reed valves may be used in parallel or in larger size where greater capacities are desired.

Such reed valve comprises an elongated cylindrical outer shell 506, 6 inches internal diameter, closed at one end 507 and open at its opposite inlet end 508. An exit tube 510, elongated and cylindrical in shape is located internal of tube shell 506 and coaxial therewith; it is 4 inches internal diameter, closed at one end, 511 and open at its exit orifice 512 and provided with a plurality of 1/8 inch diameter perforations as 513, 513' 513" (providing a total perforation area 3 times the area of orifice 512) as air inlet holes; these holes are spaced 3/8 inch center to center and arranged in parallel lines behind the equispaced reed valve fingers, as 515, 516, 517, 518, 519, 520, and 521, each six inches long and 3/16 inch wide and elastically held in place by a head ring 522. The valve fingers are separated from one another by 1/8 inch grooves and made of thin flexible stainless steel and extend over and in direct contact with the orifices of the valve perforations as 513, 513', etc., to the interior of tube 510. Tube 510 has a taper of .06" per foot to slightly compress the fingers at their lower end. Such valves provide substantially greater air inlet area than the ball valves shown, for purposes of simplicity, as illustrative of conventional check valves which may be used. The valve housing 506 may be replaced by an air filter for use of these reed valves as an inlet check valve; then such modified reed valve would substitute for inlet check valves 27 of FIGURES 1 through 11 and inlet check valve 167 and 166" of FIGURE 13.

The embodiment of this invention 601 shown in FIGURES 33–37, comprises an air compressor subassembly 621, a generally Y-shaped engine subassembly 622, a turbine supercharger 264 and a valve and timing subassembly 623 all co-operating as one assembly.

Broadly, the new engine apparatus 601 of FIGURE 33 corresponds generally to the engine shown in FIGURES 1 through 5 of our prior invention with the fluid reservoir chamber 25 is substituted for generally by a U-shaped subassembly as 145 of FIGURE 13 of our prior invention.

Also the hydraulic car engine 601 provides valve connections and has a motor control generally such as are shown in the device of FIGURE 13 with the use of the turbine on the exhaust applied to the device of FIGURES 1 and 12 as shown in FIGURE 5. The major functional subassemblies of the pump unit of FIGURES 33 through 37 are an air compressor subassembly and valving system 621 shown in FIGURE 32, a combustion and hydraulic power system 622 as shown in FIGURE 31, and a timing and valve subassembly shown generally as 623 in FIGURE 31.

The air compressor subassembly comprises as shown in FIGURE 32 a cross over tank chamber 747 (corresponding to tank 147 in FIGURE 13) an air storage tank 629 (corresponding to element 29 of FIGURE 1 and element 152 of FIGURE 13) an air compressor piston 852 (corresponding to air compressor piston 252 of FIGURE 5 and 163' of FIGURE 13) in air compressor cylinder chamber 626 (corresponding to element 26 of FIGURE 1 and chamber 148 of FIGURE 13). A check valve outlet 628 in line to tank 629 (corresponding to element 28 of FIGURES 1 through 11), an inlet check valve 627 (corresponding to element 27 of FIGURES 1 through 11), a rotary intake valve 655 (corresponding to element 55 hereabove), a turbo compressor 267 (corresponding to element 267 of FIGURE 5), a shaft 264 (corresponding to element 264 of FIGURE 5), a motor 646 corresponding to the motor 46 of FIGURE 1, a turbo charger exhaust turbine 270 (corresponding to element 270 of FIGURE 5), a rotary exhaust valve 683 (corresponding to valve 83 of FIGURE 5), an exhaust cylinder chamber 768 (corresponding to cylinder 148 of FIGURE 13), an exhaust piston 763" therein (corresponding to the piston 163" of FIGURE 13), a compressor fluid 162 and an aluminum engine frame 602.

30

The connections of these elements are as follows: The air compressor subassembly 621 comprises a U-shaped tank 747 (corresponding to tank 147 of FIGURE 13) with vertical upstanding cylindrical arms 748 and 749 and chambers 626 and 768 respectively therein joined by a hollow C-shaped portion 790: (like items 148, 149, and 190 of FIGURE 13) each arm, except as below described, is closed at its top. The compressor chamber operates with a U-shaped chamber to take advantage of the oscillation period of the liquid in such a chamber. Orifice plats may be provided as in FIGURE 13 to more closely control the frequency characteristics of such oscillations. In this embodiment, a liquid discharge is effected. The U-shaped portion 790 is filled with liquid 162, and said fluid extends, at rest to level 163' in arm 748 (covered by piston 852) and to level 163" (covered by piston 763") in arm 749 when that liquid 762 is at rest at which time the levels 163' and 163" each extend to one-half way up the height of the vertical portion of said vertical cylinders. The top of arm 748 is closed to form a chamber 626. The top of that chamber opens to a one-way inlet valve 627 (like 167 and 27) into which inlet line 666 feeds. A one-way discharge valve 728 (like 28 and 150) is also located at the top of chamber 626 and connects the interior of said chamber to compressed air discharge line 751 and tank 629 (like 151 and 152 respectively in FIGURE 13).

The top arm 749 is closed to form a chamber 768; the top of that chamber connects to the rotary exhaust valve 683 of the valve and timing subassembly 623 of this engine. The discharge of the exhaust valve 683 in this embodiment is connected to the turbine wheel 157 of supercharger 270 at the air intake portion 267 of which is a compressor wheel 159 which supercharges the air passing to the air compressor chamber 626.

The combustion and hydraulic power system comprises as shown in FIGURE 31 within the frame 602, a combustion chamber 36, a combustion piston 251 (as in FIGURE 5), a fluid discharge valve 39, a fluid discharge line 40, a fuel injector 55, a spark plug 37, a combustion piston 251, a fluid suction valve 35 within the fluid suction line 34. The elements 34, 35, 36, 37, 39, 40 and 55, 162 corresponding respectively to elements of same number in FIGURES 1 through 12. The engine hydraulic fluid 200 is the same as used in the embodiment of FIGURE 5.

The subassembly 623 comprises a motor 46, an ignition spark system 647 and a fuel injection system 648.

The fuel injection system pump 648 is driven by the motor 46 to inject fuel through the injector 55 at the proper time in the cycle as below described. The conventional ignition spark system 647 comprises a source of E.M.F. 645, a coil 650, and a timer 649 to effect sparking at the plug 37 at the proper time in the cycle as below described.

The speed of engine 601 is controlled by its motor 46. The speed of that motor is controlled by an adjustable rheostat 644 which is adjusted by a foot throttle control 871 (like 271 in FIGURE 5). A generator 642 is driven by the turbocharger 264. A regulator (R) controls the output of the generator.

The motor 46 is connected by pulley belts as 783 and 766 and 748 and 750 to items 683 and 666 and 648 and 650 respectively to synchronize the actions thereof as below described.

Broadly the stages of operation as shown in FIGURES 33, 34, 35, 36 and 37 correspond, respectively, to the stages of operation of the pump assembly shown in FIG-URES 1, 2, 3, 4 and 5 respectively. The operation of the motor 601 of FIGURES 31–37 is as follows.

In the stage of the cycle shown in FIGURE 33 the injection valve control system 623 moves the valve 655 to its closed position and valve 683 to the open exhaust position. The compressor 267 and exhaust turbine 270 are energized by exhaust gases escaping from chambers 768 and 36, and drive the air compressor piston 852 downward and drive the exhaust piston 763" upward. The liquid 200 is at sufficient pressure to open the one-way valve 35 and pass therethrough and raise piston 251.

In continued operation as shown in FIGURE 33 the air compressor piston is further driven downward and the exhaust piston 763" is driven further upward as the compressor 267 increases the pressure in chamber 748 and the exhaust fan 157 in the exhaust turbine 270 exhaust the pressure in chamber 768. The liquid 162 in the cross over portion of tank 747 moves from right to left as shown in that figure. The control subassembly keeps the valve 655 closed and the valve 683 open at this point. Following this stage the control subassembly 623 closes the valve 683.

Following exhaustion of the gases in the chamber 36 left there by the previous combustion the control subassembly 623 by the motor 46 drives the valve 683 to close and the valve 655 to open as shown in FIGURE 34. With valve 655 open the compressed air from chamber 629 flows into chamber 36. Concurrently, the subassembly 623 drives the fuel injector subassembly 648 to operate through the ejector 55 to inject a combustible fuel into the combustion chamber 36.

After the fuel and air has been thus injected into chamber 36 the valve 655 is closed by subassembly 623. After valves 683 and 655 are closed the spark plug 37 is actuated by the mechanism 648, 649 and 650 and ignites the gas in the chamber 36 and the combustion thereof force the piston 254 downward. This force as shown in FIGURE 35 in chamber 36 closes the fluid suction valve 35 and opens the valve 39 and discharges hydraulic fluid 200 through the line 40.

On completion of the time required for combustion subassembly 623 turns the valve 683 to its open position as shown in FIGURE 36 and initiates the exhaust stroke to the exhaust cylinder. At this time the combustion piston 251 is at the bottom position in the chamber 36 and the combustion gases, then under exhaust pressure in chamber 36, pass through valve 683 and urge the piston 763" downward. This downward motion serves to force the piston 852 upward and close the valve 627 and force air which had previously been sucked or moved by the fan 159 into the chamber 748 into the air storage tank 629 through the valve 628.

After the exhaust gas from chamber 36 has exerted its full pressure and piston 852 has risen to the position shown in FIGURE 37, at which time the air previously in air compression cylinder 748 has been moved to the air storage tank 629 under pressure and the valve 628 has dropped into its sealing position as shown in FIGURE 37, the valve 683, which is a three-way valve (as also shown in FIGURES 33, 36, and 32) connects the chambers 36 and 768 with the exhaust turbine fan 157 of the subassembly 270. Thereupon, as shown in FIGURE 37, the exhaust gases from the combustion cylinder as well as the exhaust cylinder 768 are passed through the discharge or exhaust turbine and they serve to provide energy with which to drive the compressor 267. Following the stage shown in FIGURE 37 the valve 683 turns as shown in FIGURE 33 to complete the exhaust of the chamber 768.

Following the movement described for FIGURE 37 the valve 683 is turned by the subassembly 623 to the position shown in FIGURE 33. During the stage between FIGURES 37 and 38 the turbine 270 has been operating to drive piston 852 downward and to fill chamber 748 with fresh air. Accordingly, the pressure of the exhaust gases from the chambers 36 and 768 serve to drive the turbine 270 and thereby to fill the chamber 748.

The subassembly 623 is arranged to drive the valve 683 to the closed position as shown in FIGURE 34 after exhaustion of the combustion gases have been complete. The valve 655 may be opened for a short time prior to the complete closing of the valve 683 to provide some scavenging action.

At any rate when the energy of the exhaust gases has been substantially completed for practical purpose utilized and effected adequate intake of gas in chamber 748, valve 683 is closed and valve 655 is full open as in FIGURE 34, then closed. Thereupon the combustible fuel is injected by injector 55 as above described and, thereafter, spark plug 37 is actuated to produce the power stroke as shown in FIGURE 35.

The engine 601 may be used to drive the engine and vehicle shown in FIGURE 5 by inserting in the lines 34 and 40 of FIGURE 5 for that in lines 34 and 40 of the apparatus of FIGURE 33 whereby to drive the vehicle shown in FIGURE 5.

This vehicle 801 comprises an engine 601 and wheels as 235, 236 and 235' mounted with other units shown in FIGURES 39 and 40 on a frame 932 and is an improvement over that shown in FIGURE 5.

This provides that the combustion chamber 36 is connected by a hydraulic line 803 to a compressor 804 which provides for compressing the refrigerator fluid which is then sent through the condenser coils 806 following which they pass through an expansion valve 808 to cooling coils 810. Coils 810 serve to refrigerate the air sent to the interior of the car 801 for the comfort of passengers therein.

The fluid discharge line 40 of engine 601 passes to a drive control center 220 adjusted by a throttle control arm as 243. The main high pressure line therefrom, 203, passes through a brake control point 273 where the operator's foot brake pedal 272 serves to aceuate piston such as 273 and 274 whereby the flow of fluid to the hydraulic motors as 204 and 205 for the wheels as 235 and 236 is controlled. As above described the shafts 233 and 234 are driven by the motors 204 and 205 respectively to drive the wheels 235 and 236 respectively.

Line 206 is the low pressure or return line from the motors for such wheels as motors 204 and 205 and 204' and 205'. Another hydraulic line 812 passes to a roll control cylinder chamber 814 which control cylinder is connected to and driven by a feed back road control subassembly 816. Fluid from this cylinder 814 in turn drives a piston in a power cylinder 818. The roll control feed back subassembly 816 is sensitive to the motion of the roll of the car with the arm 820 thereof being pivotally moved to one side or the other as the car rolls and providing by a connection of arm 120 to a rod 821 connected to a piston in chamber 814 for movements of the pistons attached to the rod 821 to adjust flow of fluid from line 812 to the power cylinder 818 thereby moving the power cylinder piston 822 therein to one side or the other. The power cylinder piston 822 is thus moved dependent upon the motion of the arm 82. A conventional low pressure hydraulic return line 824 is provided for this control subassembly. A hydraulic road clearance control is powered by fluid 200 from the lines 40 and 812 also. The control action starts at a control lever 872 which actuates a piston 874 in road clearance control chamber 870 from which hydraulic fluid passes to the power cylinder chamber 876.

A power or high pressure hydraluic line 825 comes off the line 812 and operates through various cylinders as 836 and 837 and 830 which are normal extension pistons by which operate via lines as 837' on the shock struts as 832 for the wheel 235 (attached to the motor 204) while the other lines as 830" go to corresponding shock struts as 832' for the other wheels to control road clearance of the vehicle 801. High extension pistons as 826, 827, 829, 830 provide for more road clearance. It will be noted that the valves as 874 in chamber 870 provides that fluid is not passed to the piston 826, 827, 829 and 830 until the high position of road clearance control arm 872 is desired.

A differential hydraulic power cylinder 836 is also connected to the subassembly 816 via lines 880 and 881 whereby to power either the left or right set of wheels depending upon the roll of the car during a turn.

A hydraulic system comprising lines 882 and 883 and a rear wheel steering cylinder 844 are likewise controlled by the subassembly 816 and connected to the rear wheels for the steering thereof by arms 845 and 846 to control arms 847 and 848 attached to the shafts on which the wheels as 234 and 235 are mounted.

An extension 840 of the hydraulic line 203 also provides power to a conventional power steering apparatus 842 controlled by steering wheel 841.

The engine 602 is provided also with an educator pipe 850 attached to the exhaust turbine 270 whereby to draw cooling air through the engine compartment.

The apparatus is also provided with a venturi 852 to draw hydraulic fluid through heating coils 854 which heating coils are connected to the intake line 34 of the engine 601.

Another venturi 856 is provided in the return line 34. This venturi is attached to a bellows 858 which actuates a conventional rheostat 860 in an electric circuit 862 to provide an indication of speed at 861 and actuate mileage indicator at 863.

Thereby according to this invention the hydraulic car 801 operates at an integrated unit whereby the energy of the explosion in engine 601 provides not only the energy for the exhaust and compression of the gases fed thereto and directly provides power to the wheels of the vehicle as 235 but also the hydraulic engine provides for power steering directly as by the subassembly 842 and also provides the power of motor 601 for roll control of the car, for rear wheel steering, air conditioning and heating of the car and road clearance control.

The air duct 878 of the car passes to the intake fan 267 of the engine 601 which engine is located at the rear of the car. The shock struts 832' and 832 are similar in structure as are the drive motors 204 and 204'. The duct 878 provides for sending air through the refrigerated coils as 810 or past the heating coils 854 as needed and then being sent out to the car interior or cabin. It will be noted that the seat 880 for the driver is located comfortably near the controls 243 for the hydraulic drive selector to control 872 for the road clearance, to foot brake 272 and feed control 643 indicator as 861 and 863 likewise convenient to the operator.

Although in accordance with the provision of the patent statutes, particular preferred embodiments of this invention have been described and the principles of the invention have been described in the best mode in which it is now contemplated applying such principles, it will be understood that the operations and constructions shown and described are merely illustrative and that the invention is not limited thereto, and accordingly, alterations and modifications which readily suggest themselves to persons skilled in the art without departing from the true spirit of the disclosure hereinabove are intended to be included in the scope of the annexed claims.

We claim:

1. A hydraulically powered vehicle comprising a frame, a hydraulic engine thereon, said frame supported by a plurality of wheels each driven by a hydraulic motor, each said motor operatively connected to said engine, wherein said engine comprises a combustion chamber with an inlet for air and an inlet for fuel and a gas discharge outlet near the top thereof, valve means in each of said inlets and outlets for opening and closing each of said inlets and outlet, an air compressor and gas compressing means in said compressor and air compressor discharge means operatively connected to said compressor, said air compressor discharge means openings through an opening and closing valve means to an air reservoir tank, said opening in said air reservoir tank being operatively connected, through an opening and closing valve means, to said inlet for air, and the gas discharge outlet of said combustion chamber being operatively connected, through an opening and closing valve means, to said gas compressing means within said gas compressor and actuating said compressor, and wherein the bottom of said combustion chamber contains a liquid and said combustion chamber is provided at its bottom with inlet and outlet valve openings, closed by one-way inlet and outlet valves, respectively, and one said outlet valve in said engine connects via liquid conduits to the inlet valve thereof through the motors driven by said liquid, and an adjustable valve controls the drive of said motors by said liquid.

2. Apparatus as in claim 1 wherein said wheels are each vertically mounted on said frame on hydraulic wheel mountings and each of said hydraulic wheel mountings are operatively connected by hydraulic lines to said engine.

3. Apparatus as in claim 2 comprising means sensitive to the roll of said vehicle and said means are operatively connected to hydraulic control means which are operatively connected to said hydraulic wheel mountings and to said hydraulic engine outlet line whereby said hydraulic engine, in response to said roll sensitive means adjusts the wheels on their hydraulic mountings.

4. Apparatus as in claim 1 wherein vehicle comprises a cab on said frame and the air intake means of said engine is connected to an air intake means of the cab whereby the air intake of the engine serves to draw air through the vehicle cab.

References Cited by the Examiner

UNITED STATES PATENTS

| | | | |
|---|---|---|---|
| 671,775 | 4/1901 | Duham et al. | 103—249 |
| 1,257,217 | 2/1918 | Griffith | 103—249 |
| 2,996,135 | 8/1961 | Grabow | 180—44 |
| 3,129,781 | 4/1964 | Stein | 180—44 |
| 3,154,164 | 10/1964 | Shaw et al. | 180—44 |
| 3,177,964 | 4/1965 | Anderson | 180—44 X |
| 3,202,108 | 8/1965 | Fly et al. | |

A. HARRY LEVY, *Primary Examiner.*